(12) United States Patent
Queen et al.

(10) Patent No.: US 11,909,023 B1
(45) Date of Patent: Feb. 20, 2024

(54) MODULAR, STACKABLE PCM-BASED THERMAL BATTERY APPARATUS

(71) Applicant: PHASESTOR LLC, Asheboro, NC (US)

(72) Inventors: Alfred Scott Queen, Asheboro, NC (US); Byron C. Owens, Asheboro, NC (US)

(73) Assignee: PHASESTOR LLC, Asheboro, NC (US)

(*) Notice: Subject to any disclaimer, the term of this patent is extended or adjusted under 35 U.S.C. 154(b) by 0 days.

(21) Appl. No.: 18/271,628

(22) PCT Filed: Mar. 27, 2023

(86) PCT No.: PCT/US2023/016473
§ 371 (c)(1),
(2) Date: Jul. 10, 2023

(51) Int. Cl.
| | |
|---|---|
| *H01M 10/659* | (2014.01) |
| *H01M 50/258* | (2021.01) |
| *H01M 10/44* | (2006.01) |
| *H01M 10/6568* | (2014.01) |
| *H01M 10/657* | (2014.01) |
| *H01M 10/613* | (2014.01) |

(52) U.S. Cl.
CPC ....... *H01M 10/659* (2015.04); *H01M 10/443* (2013.01); *H01M 10/613* (2015.04); *H01M 10/657* (2015.04); *H01M 10/6568* (2015.04); *H01M 50/258* (2021.01)

(58) Field of Classification Search
CPC ............. H01M 50/258; H01M 10/659; H01M 10/443; H01M 10/6568; H01M 10/657; H01M 10/613
See application file for complete search history.

(56) References Cited

U.S. PATENT DOCUMENTS

| | | |
|---|---|---|
| 2011/0286724 A1 | 11/2011 | Goodman |
| 2017/0219294 A1 | 8/2017 | Longis et al. |
| 2021/0389056 A1 | 12/2021 | Calvet et al. |
| 2022/0154992 A1 | 5/2022 | Siddiqui et al. |
| 2022/0187028 A1 | 6/2022 | Ben Nun et al. |
| 2023/0061277 A1 | 3/2023 | Owens et al. |

*Primary Examiner* — Sarah A. Slifka
(74) *Attorney, Agent, or Firm* — TILLMAN WRIGHT, PLLC; Chad D. Tillman

(57) ABSTRACT

A thermal battery assembly includes a modules configured to be stacked vertically on top of each other. The modules includes an electronics module; a first tank module; and a second tank module. A base defines a bottom of the stack and is configured to receive thereon the lowermost module of the stack for supporting the stack on a floor. Each tank module includes a phase change material (PCM); a heat exchanger assembly with heat exchangers immersed in the phase change material, a first set thereof defining a PCM charging circuit, and a second set defining a PCM discharging circuit; a first exterior connection port configured for fluid communication with an inflow of the PCM discharging circuit and a second exterior connection port configured for fluid communication with an outflow of the PCM discharging circuit. Heating or cooling capacity can be increased by adding another tank module to the stack.

48 Claims, 32 Drawing Sheets

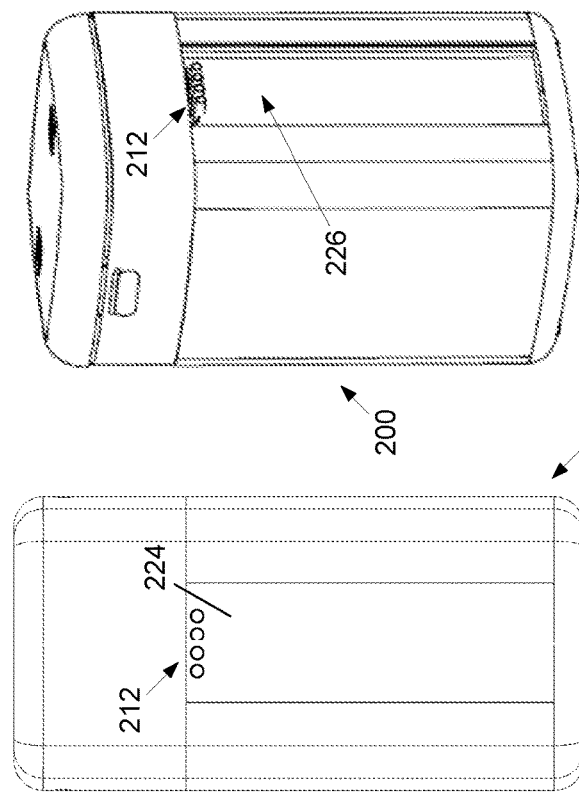
FIG. 3  FIG. 4  FIG. 5  FIG. 6
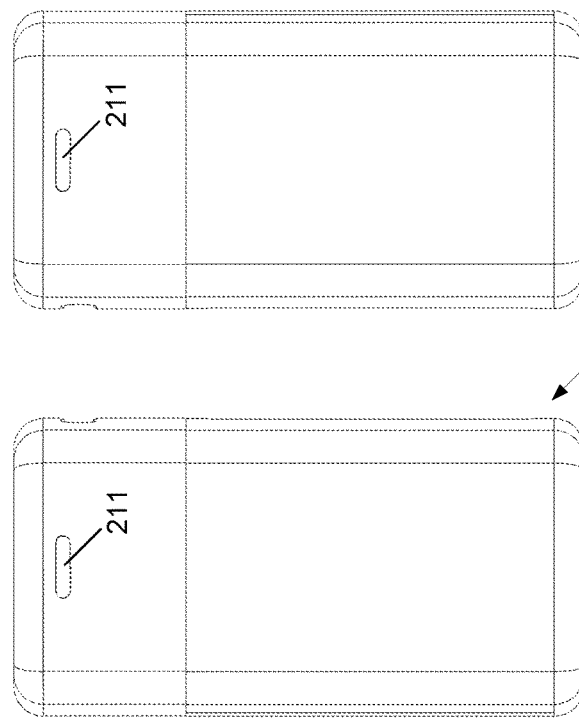
FIG. 7
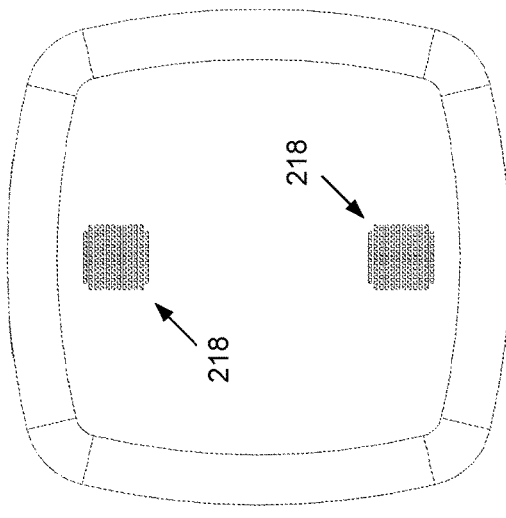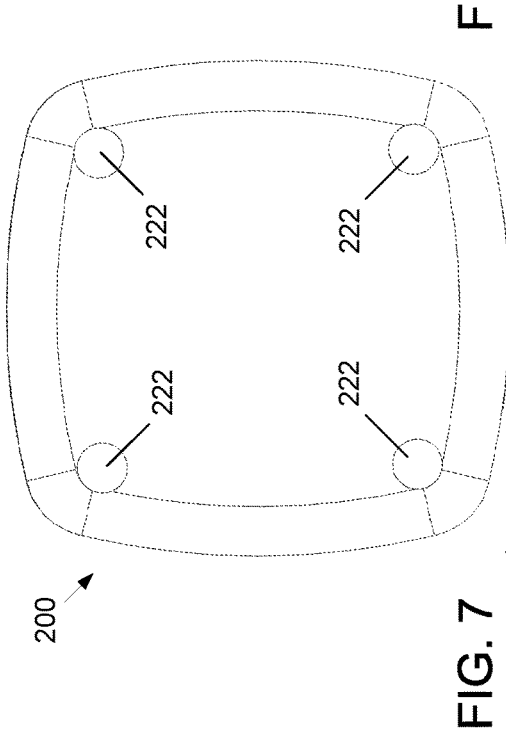
FIG. 8

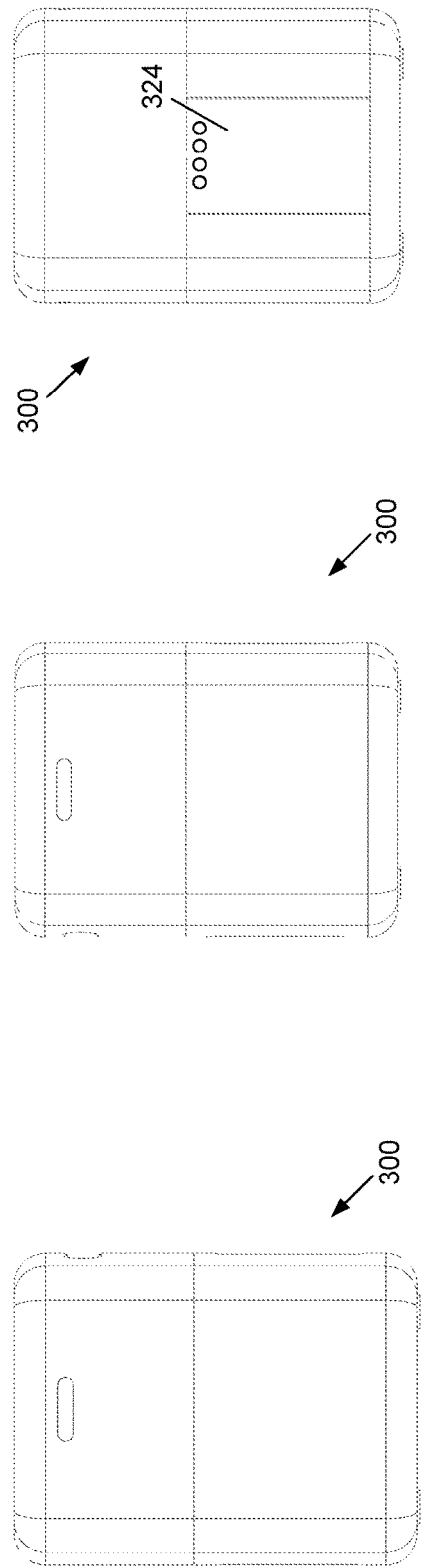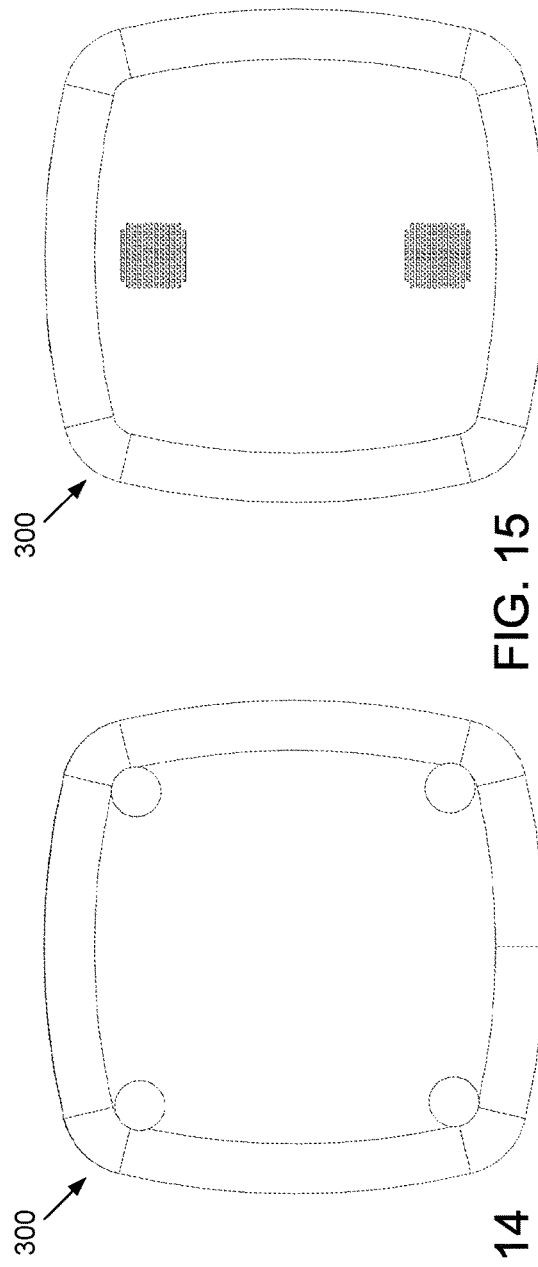

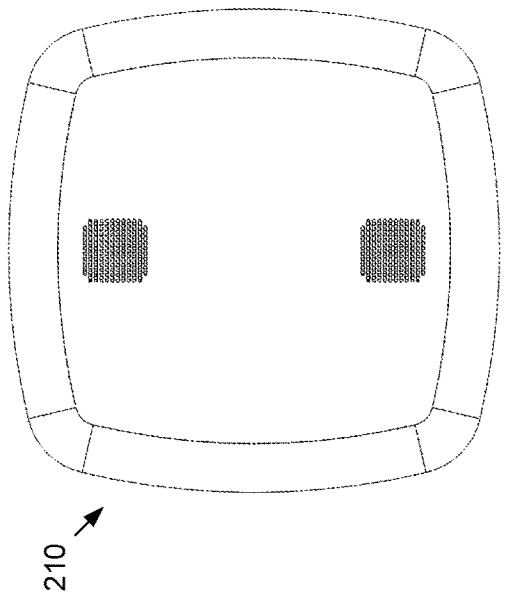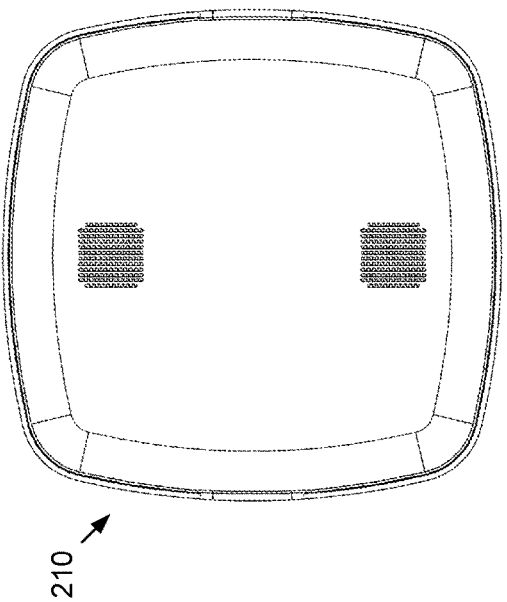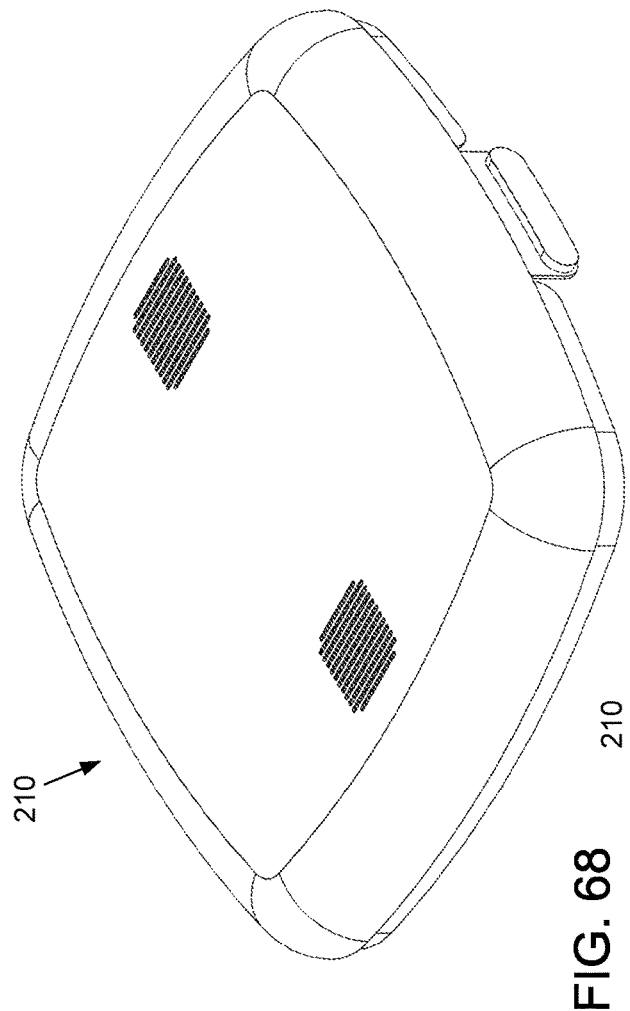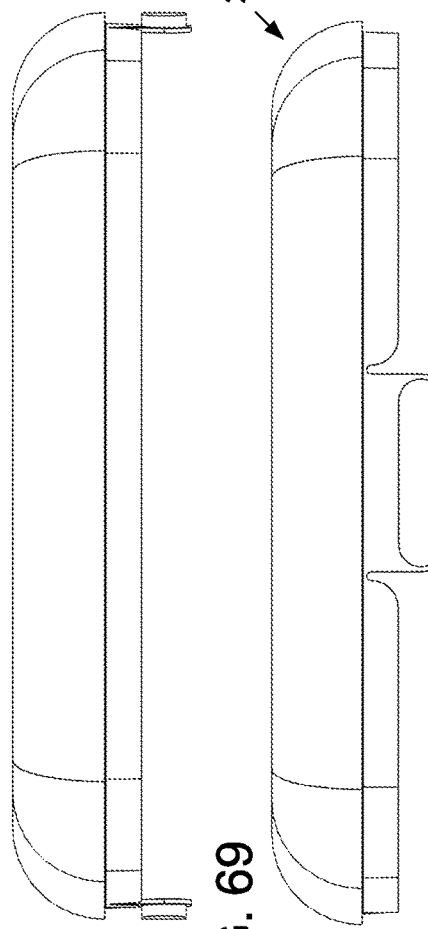

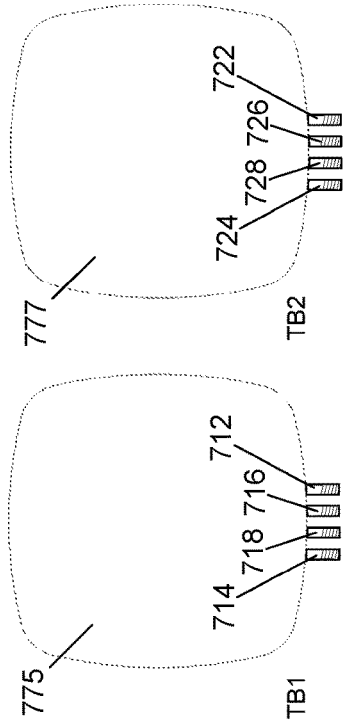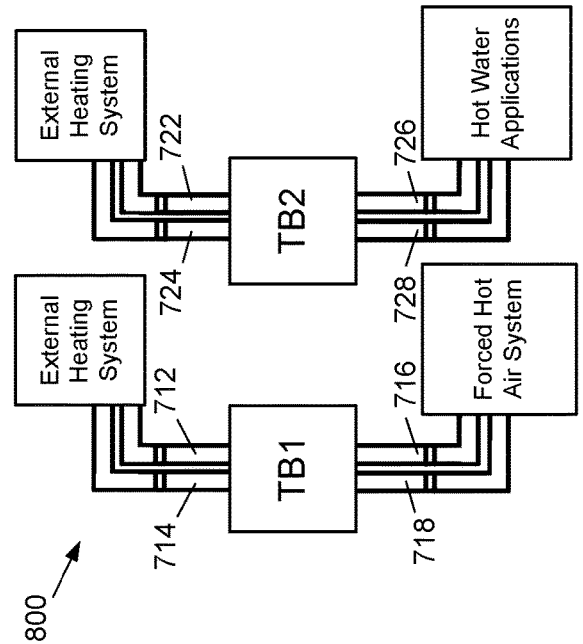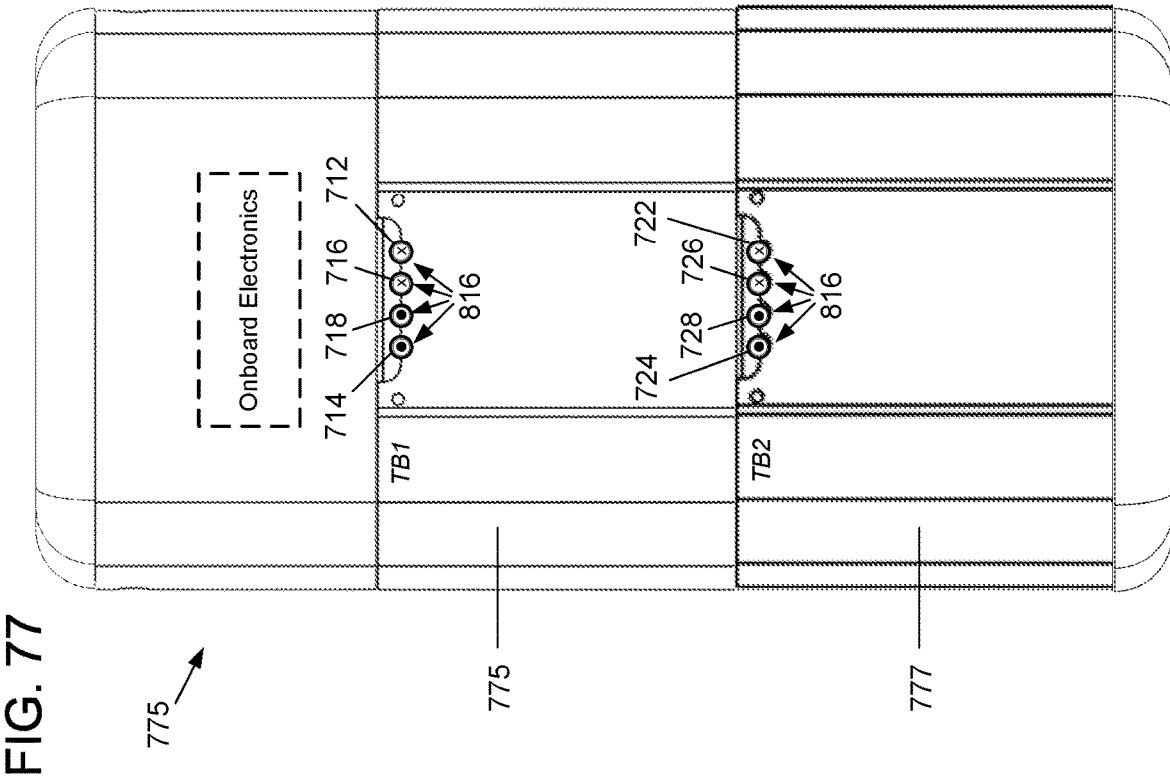
FIG. 79
FIG. 78
FIG. 80
FIG. 77

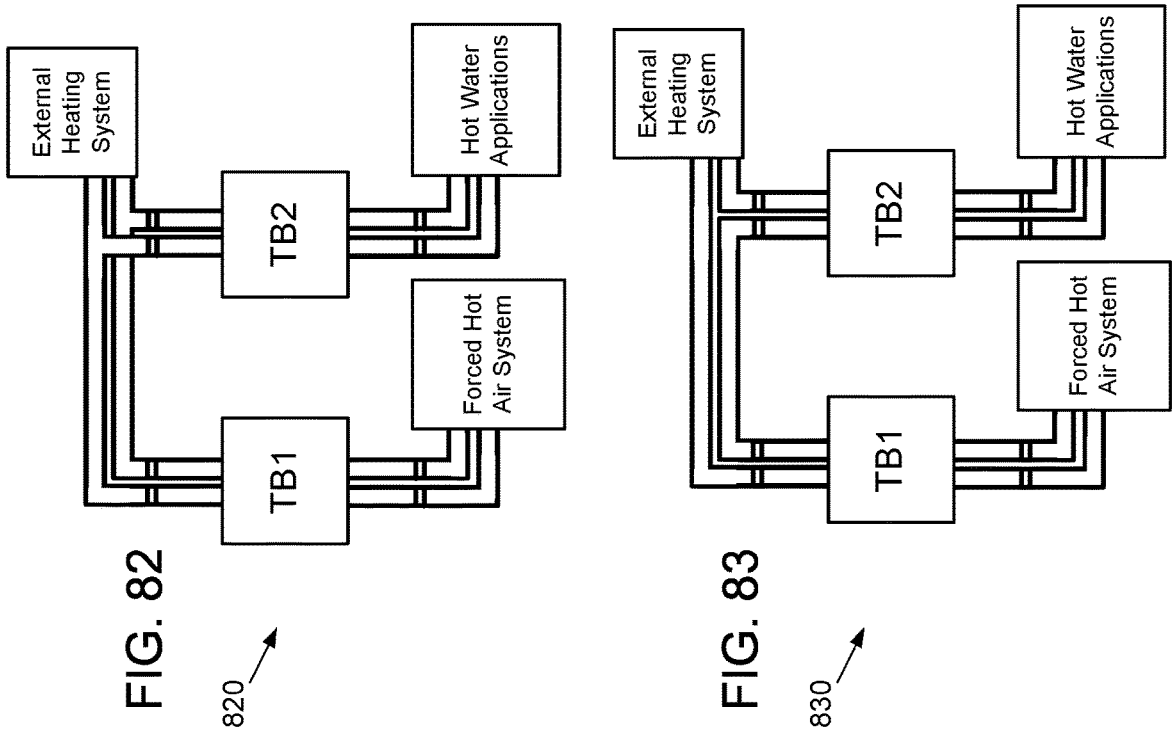
FIG. 82
FIG. 83
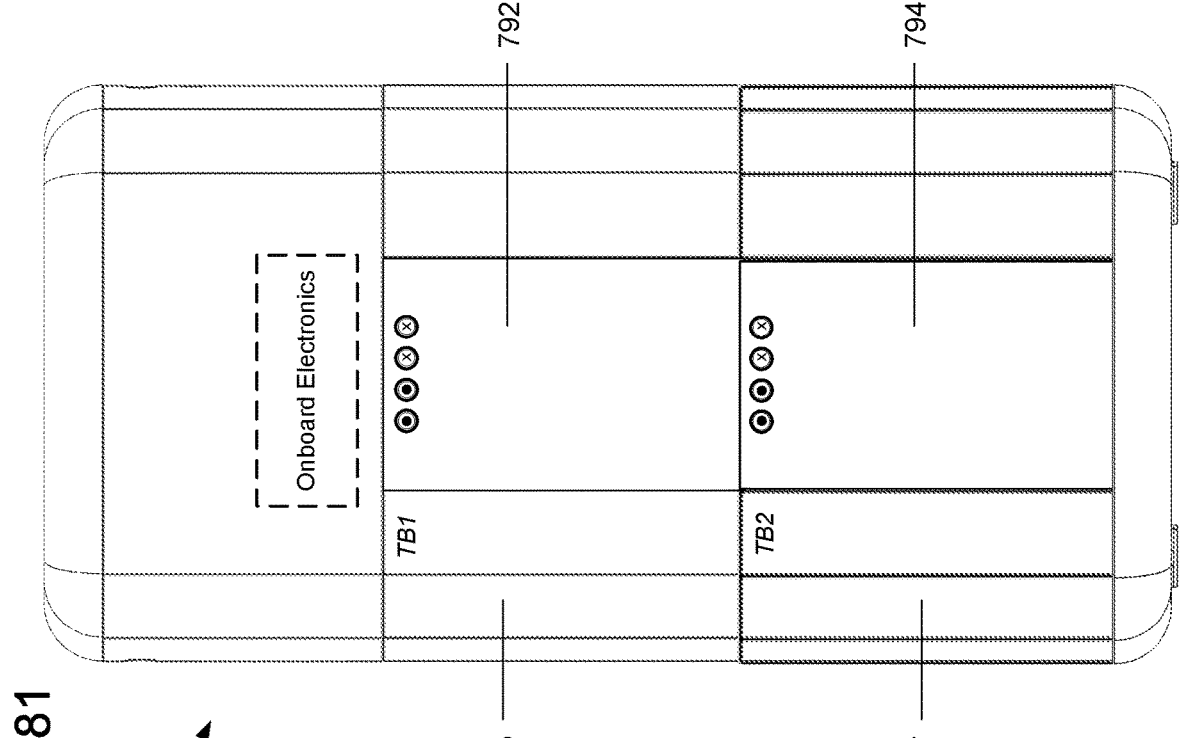
FIG. 81

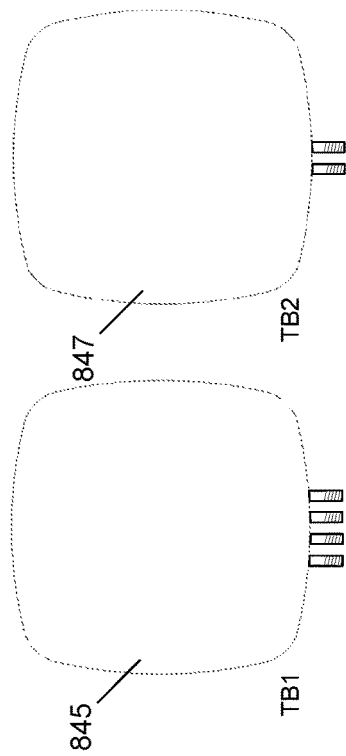
FIG. 85
FIG. 86
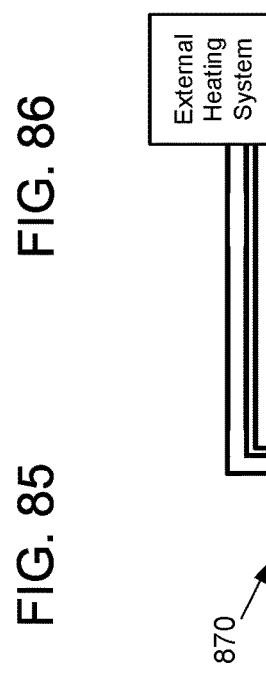
FIG. 87
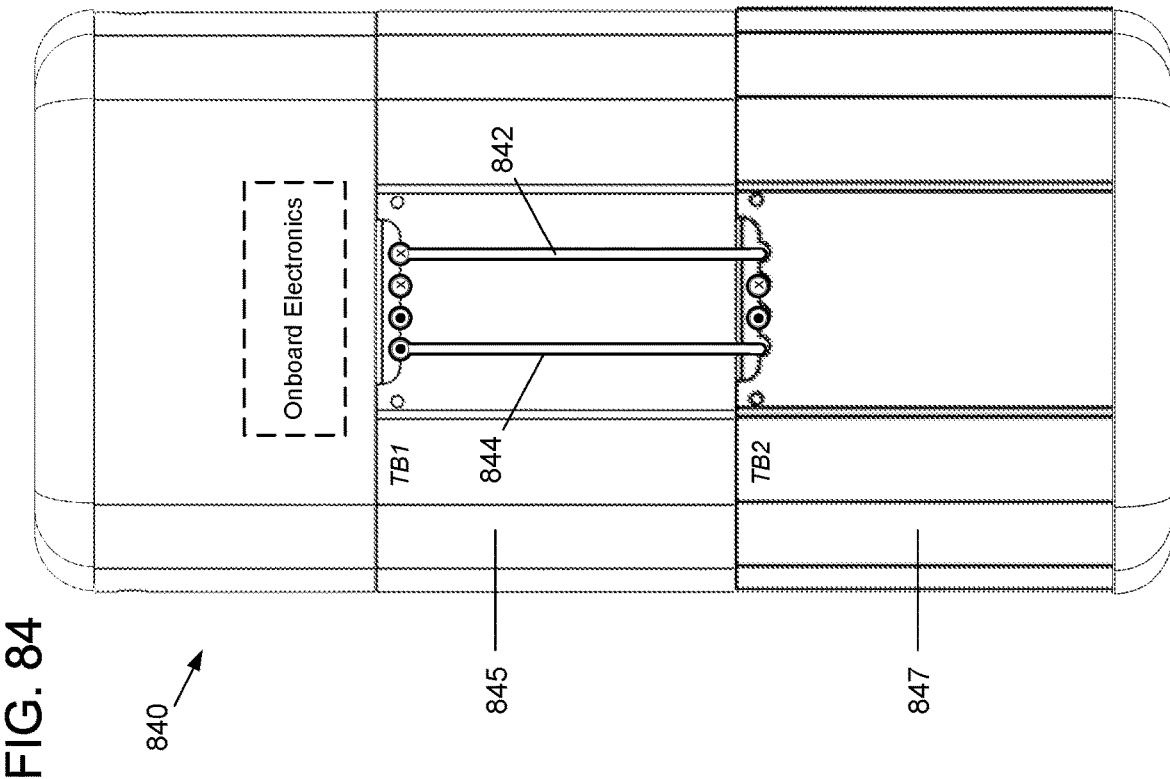
FIG. 84

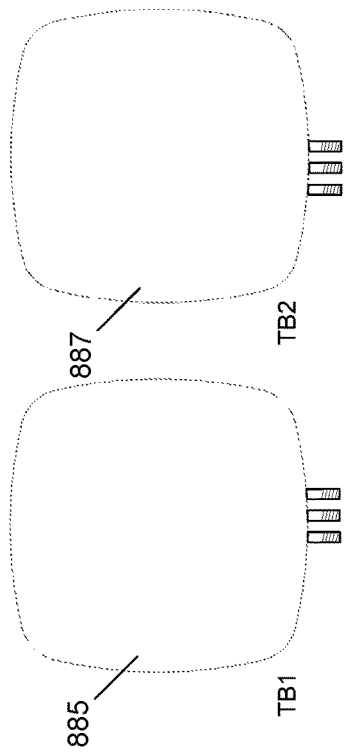
FIG. 89
FIG. 90
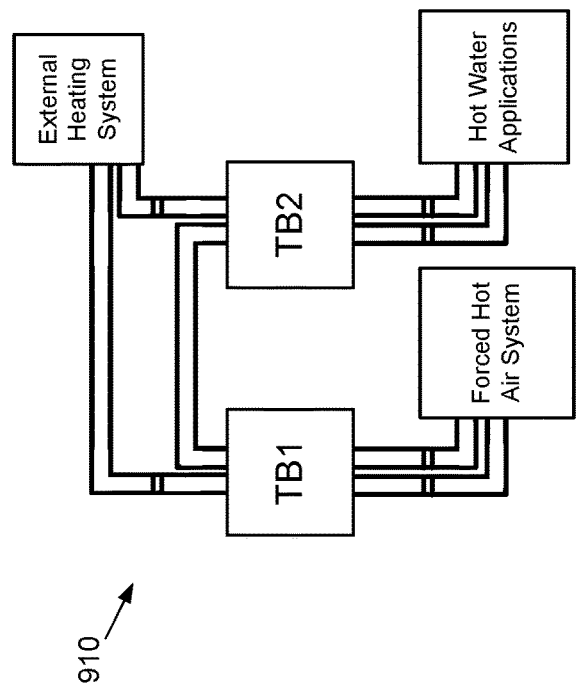
FIG. 91
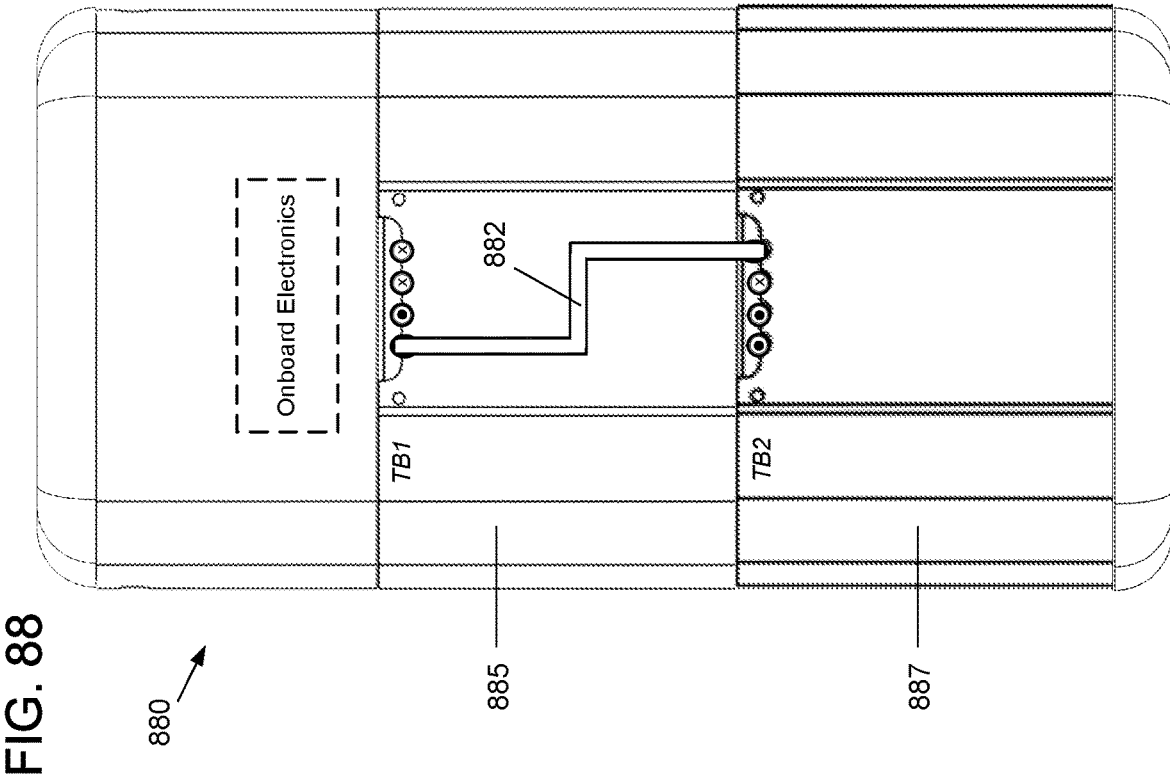
FIG. 88

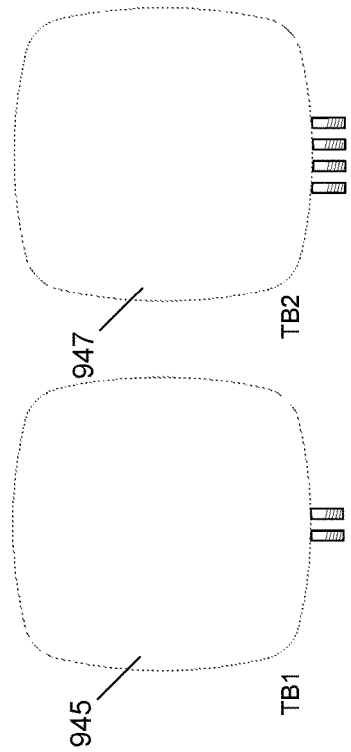
FIG. 95
FIG. 96
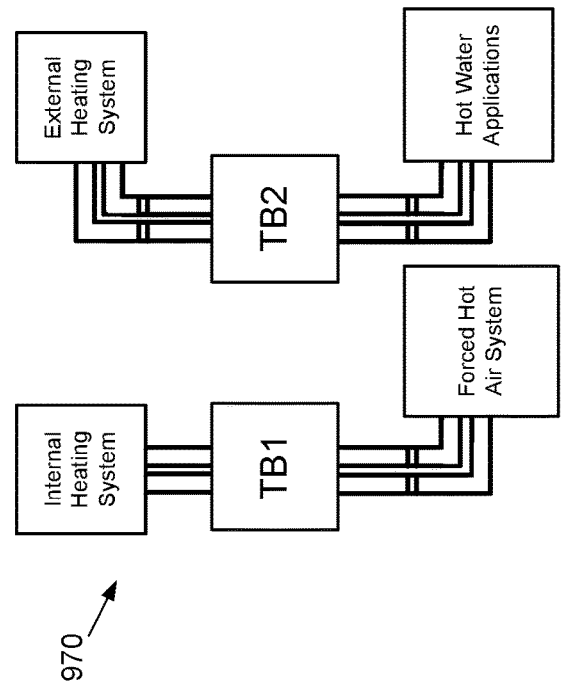
FIG. 97
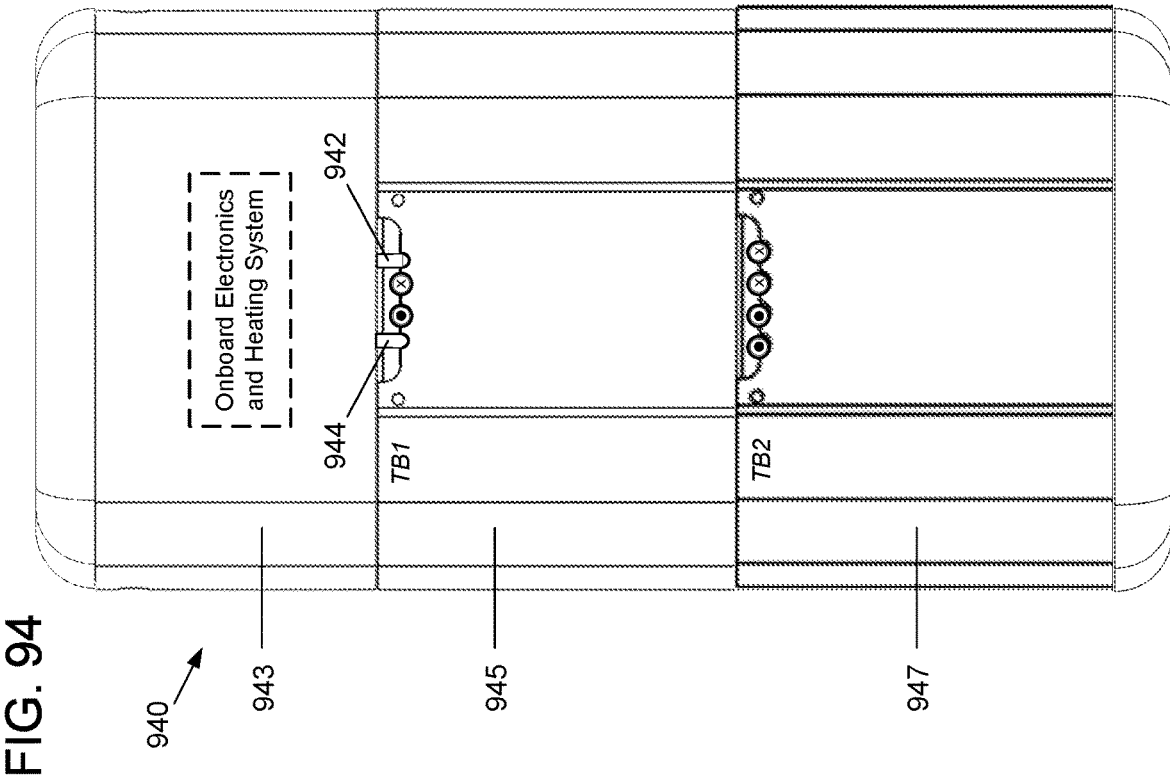
FIG. 94

980

1000

990

1010

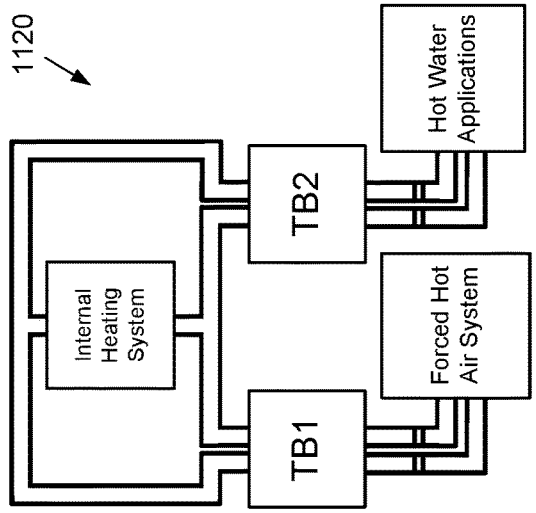
FIG. 112
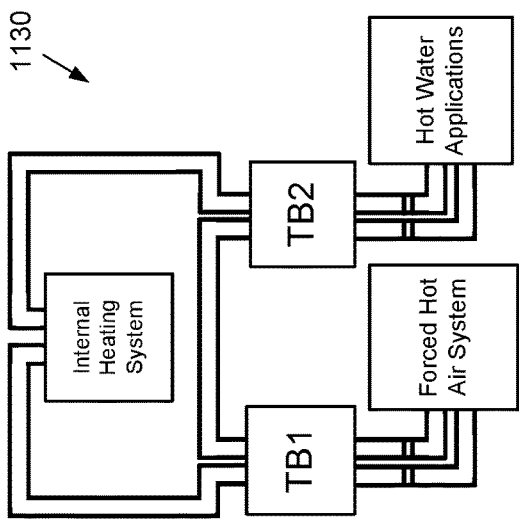
FIG. 113
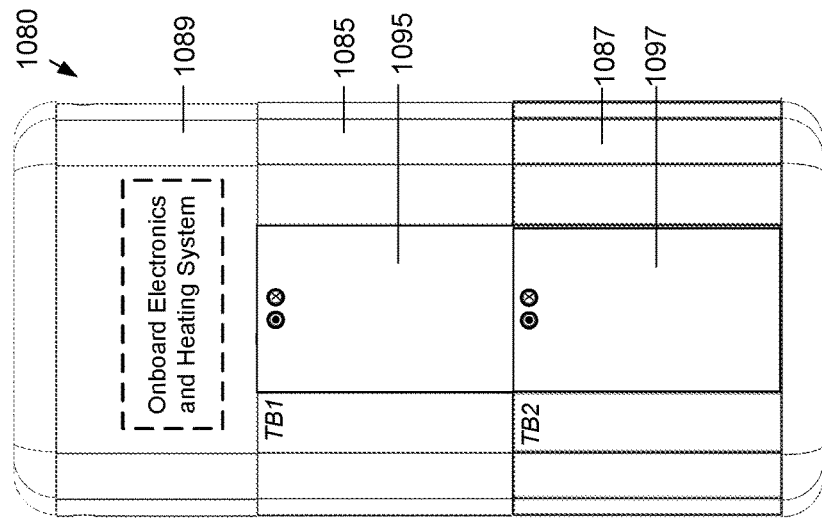
FIG. 109
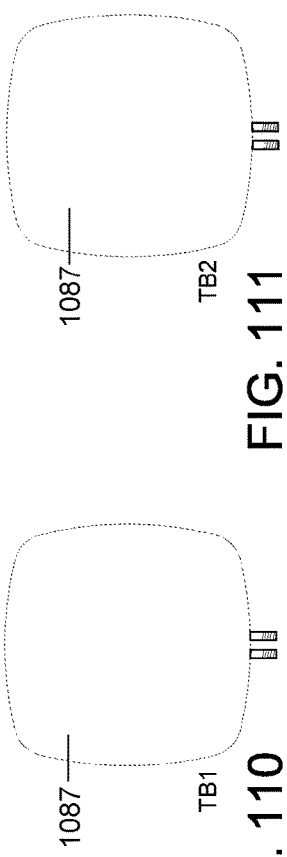
FIG. 111
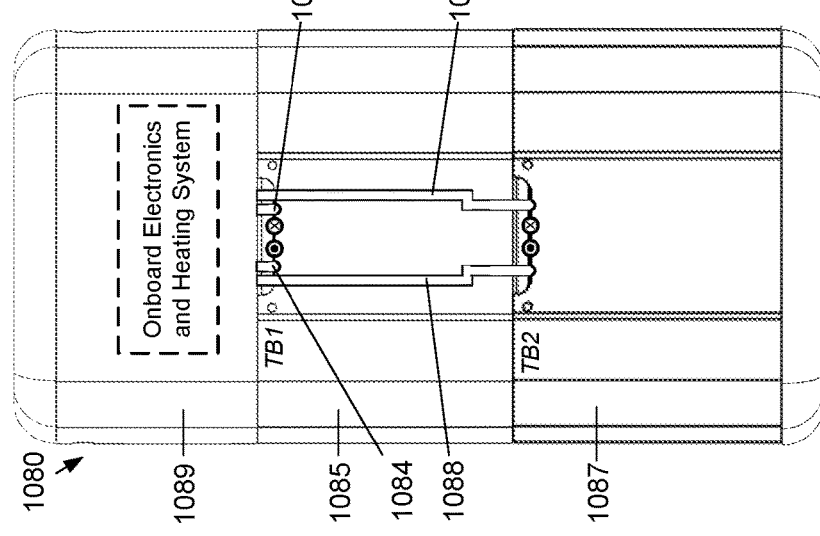
FIG. 108
FIG. 110

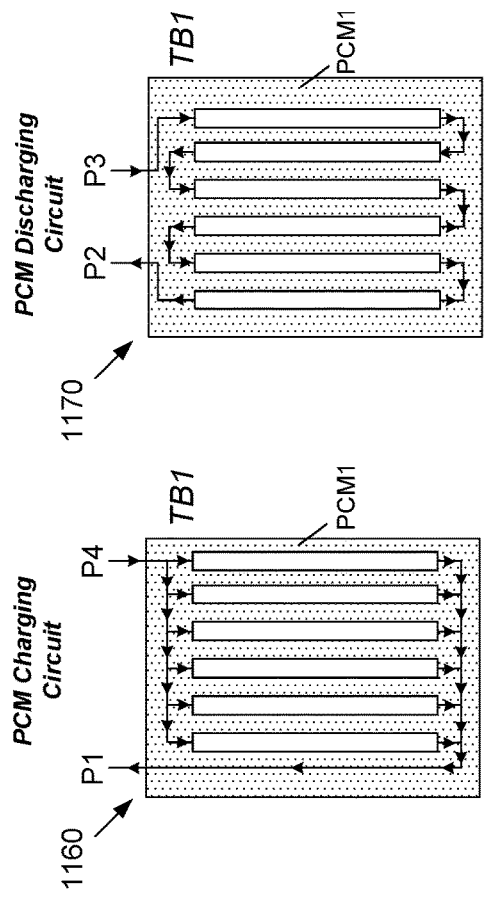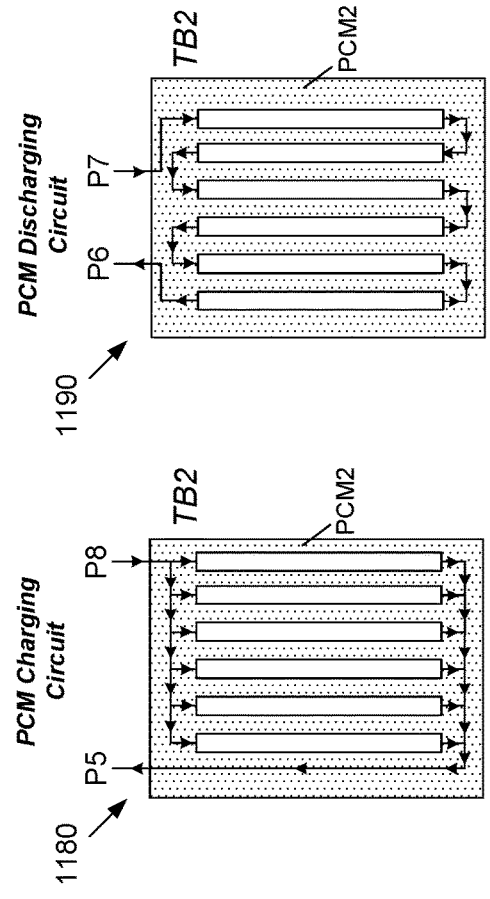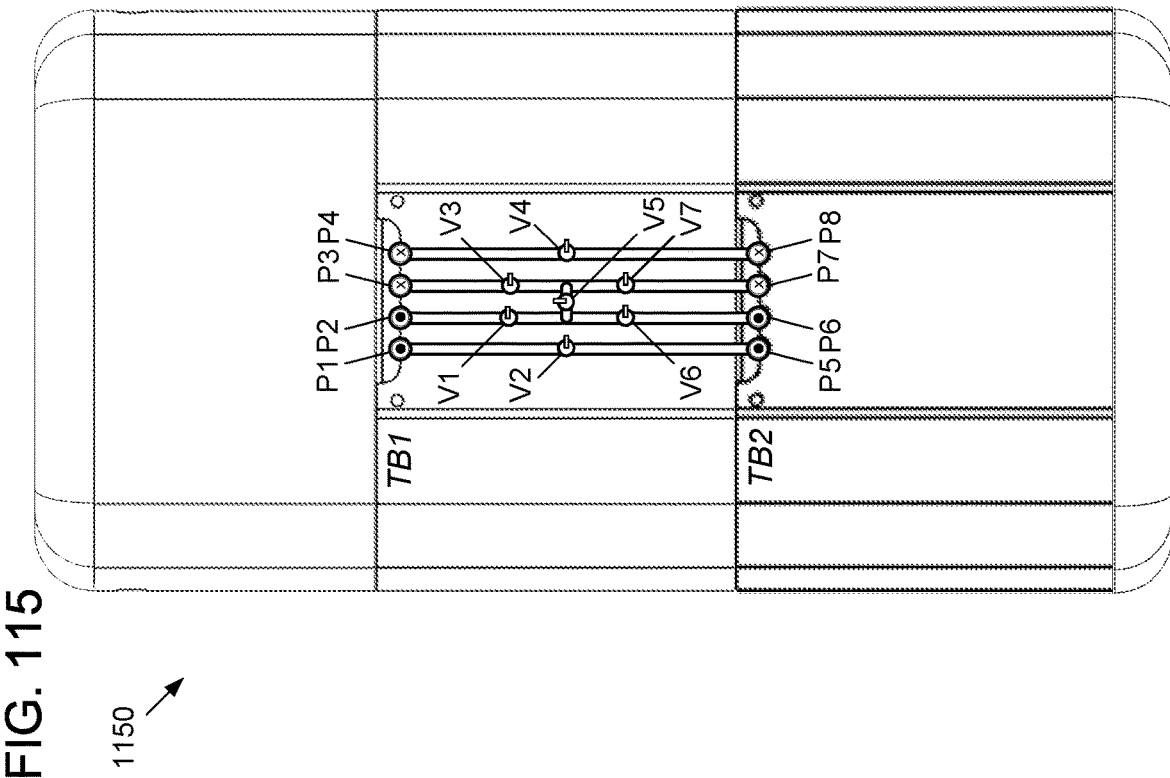

FIG. 120

TABLE 1

| Configuration of Heat Exchange Circuits | State of Valve V1 | State of Valve V2 | State of Valve V3 | State of Valve V4 | State of Valve V5 | State of Valve V6 | State of Valve V7 | State of Port P4 |
|---|---|---|---|---|---|---|---|---|
| Independent Charging Independent Discharging | Closed | Closed | Closed | Closed | Closed | Closed | Closed | Charging Input |
| Independent Charging Series Discharging | Open | Closed | Closed | Closed | Open | Closed | Open | Charging Input |
| Independent Charging Parallel Discharging | Closed | Closed | Closed | Closed | Closed | Closed | Closed | Charging Input |
| Parallel Charging Independent Discharging | Closed | Open | Closed | Open | Closed | Closed | Closed | Charging Input P4 or P8 Capped |
| Parallel Charging Series Discharging | Open | Open | Closed | Open | Open | Closed | Open | Charging Input P4 or P8 Cappaed |
| Parallel Charging Parallel Discharging | Open | Open | Open | Open | Closed | Open | Open | Charging Input P4 or P8 Cappaed |

FIG. 121

TABLE 2

| Configuration of Heat Exchange Circuits | State of Port P1 | State of Port P2 | State of Port P3 | State of Port P4 | State of Port P8 | State of Port P5 | State of Port P7 | State of Port P6 |
|---|---|---|---|---|---|---|---|---|
| Independent Charging Independent Discharging | Charging Output | Discharging Output | Discharging Input | Charging Input | Charging Input | Charging Output | Discharging Input | Discharging Output |
| Independent Charging Series Discharging | Charging Output | Discharging Output P2 Capped | Discharging Input | Charging Input | Charging Input | Charging Output | Discharging Output P7 Capped | Discharging Output P2 or P6 Capped |
| Independent Charging Parallel Discharging | Charging Output | Discharging Output P2 or P6 Capped | Discharging Input P3 or P7 Capped | Charging Input | Charging Input | Charging Output | Discharging Input P3 or P7 Capped | Discharging Output P2 or P6 Capped |
| Parallel Charging Independent Discharging | Charging Output P1 or P5 Capped | Discharging Output | Discharging Input | Charging Input P4 or P8 Capped | Charging Input P4 or P8 Capped | Charging Output P1 or P5 Capped | Discharging Input | Discharging Output |
| Parallel Charging Series Discharging | Charging Output P1 or P5 Capped | Discharging Output P2 Capped | Discharging Input | Charging Input P4 or P8 Capped | Charging Input P4 or P8 Capped | Charging Output P1 or P5 Capped | Discharging Output P7 Capped | Discharging Output P2 or P6 Capped |
| Parallel Charging Parallel Discharging | Charging Output P1 or P5 Capped | Discharging Output P2 or P6 Capped | Discharging Input P3 or P7 Capped | Charging Input P4 or P8 Capped | Charging Input P4 or P8 Capped | Charging Output P1 or P5 Capped | Discharging Input P3 or P7 Capped | Discharging Output P2 or P6 Capped |

MODULAR, STACKABLE PCM-BASED THERMAL BATTERY APPARATUS

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The invention generally relates to thermal battery apparatus and, in particular, to modular, stackable PCM-based thermal battery assemblies used in heating and cooling applications. Preferred such applications include use of a thermal battery assembly to heat water at a residence for purposes of, inter alia, showering, bathing, cooking, and washing; and to heat and/or cool air at a residence as part of the heating and cooling systems of a home. In some respects, a thermal battery assembly in accordance with one or more features and aspects of the invention is a replacement for and new type of tankless water heater.

With respect to water heaters in particular, water heaters are believed to be a major energy consumer in households and businesses, accounting for about twenty percent of energy consumption. Therefore, it is believed that improving efficiency and performance of water heaters can have significant benefits for the environment and the economy. Some improvement in electric water heaters include heat pump water heaters that use electricity to move heat from the surrounding air to the water, reducing the electricity consumption compared to conventional electric water heaters; solar water heaters that use solar collectors to capture solar energy and heat water either directly or indirectly through a heat transfer fluid; and smart water heaters that use sensors, controllers, and communication devices to monitor and adjust the operation of the water heater according to user preferences, weather conditions, utility rates, and grid signals. Smart water heaters can optimize the energy efficiency and performance of the device and participate in demand response programs.

Notwithstanding the foregoing, it is believed that further improvements would be beneficial in the current state-of-the-art in water heaters, and that thermal battery assemblies in accordance with one or more features and aspects of the invention provide operational efficiencies and advantages over such current state-of-the-art in water heaters.

SUMMARY OF THE INVENTION

The invention includes many aspects and features. Moreover, while many aspects and features relate to, and are described in, the context of water heaters, the invention is not limited to use only in such context as will become apparent from the following summaries and detailed descriptions of aspects, features, and one or more embodiments of the invention.

Accordingly, in an aspect of the invention, a thermal battery assembly comprises: a stack comprising a plurality of modules on top of each other, the plurality of modules comprising at least an electronics module and a tank module; and a base defining a bottom of the stack configured to receive thereon the lowermost module of the stack for supporting the stack on a floor. The tank module comprises a phase change material (PCM); a heat exchanger assembly comprising a plurality of heat exchangers immersed within the phase change material, a first set of the heat exchangers defining a PCM charging circuit for charging the phase change material, and a second set of the heat exchangers defining a PCM discharging circuit for discharging the phase change material; and exterior connection ports comprising a first exterior connection port configured for fluid communication with an inflow of the PCM discharging circuit and a second exterior connection port configured for fluid communication with an outflow of the PCM discharging circuit.

In a feature of this aspect, the tank module further comprises exterior connection ports comprising a first exterior connection port configured for fluid communication with an inflow of the PCM charging circuit, and a second exterior connection port configured for fluid communication with an outflow of the PCM charging circuit.

In a feature of this aspect, the electronics module comprises an onboard charging system and the PCM charging circuit is connected to the charging system for charging of the PCM. The tank module defines a chase and the assembly comprises plumbing that connects the PCM charging circuit in fluid communication with the onboard charging system in a closed fluid loop, the PCM charging circuit being apparatus-enclosed. The onboard charging system may comprise a heat pump;
an in-line electric heater located within fluid flow and a recirculation pump; or a heat pump, an in-line electric heater located within fluid flow, and a recirculation pump.

In a feature of this aspect, when stacked the plurality of modules collectively define a continuous exterior surface with seams defined therebetween.

In a feature of this aspect, the exterior connection ports are located on and extend from a back of the tank module.

In a feature of this aspect, the PCM charging circuit comprises a fluid flow arrangement of the heat exchangers that is in parallel.

In a feature of this aspect, the PCM discharging circuit comprises a fluid flow arrangement that is in series.

In a feature of this aspect, a lid is configured to be received on the uppermost module of the stack in covering relation to a top opening of the uppermost module. The electronics module preferably defines a top of the stack and is configured to receive the lid thereon, the lid enclosing and protecting electronics that are contained within the electronics module.

In a feature of this aspect, sensors are contained within the tank module for determining local temperatures of the phase change material therein, from which a measure of charge of the PCM may be determined, and the tank module comprises a visual display that indicates the measure of charge. The measure of charge preferably is determined by electronic components contained in the electronics module.

In a feature of this aspect, sensors are contained within the tank module for determining local temperatures of the phase change material therein, and the electronics module comprises a visual display that indicates a temperature associated with the tank module.

In another aspect of the invention, a thermal battery assembly comprises: a stack comprising a plurality of modules configured to be stacked vertically on top of each other, the plurality of modules comprising at least an electronics module; a first tank module; a second, additional tank module; and a base defining a bottom of the stack configured to receive thereon the lowermost module of the stack for supporting the stack on a floor. The first tank module comprises a phase change material (PCM); a heat exchanger assembly comprising a plurality of heat exchangers immersed within the phase change material, a first set of the heat exchangers defining a PCM charging circuit for charging the phase change material, and a second set of the heat exchangers defining a PCM discharging circuit for discharging the phase change material; and exterior connection ports comprising a first exterior connection port configured for fluid communication with an inflow of the PCM discharging circuit and a second exterior connection port configured for fluid communication with an outflow of the PCM discharging circuit. The additional tank module comprises: a phase change material (PCM); and a heat exchanger assembly comprising a plurality of heat exchangers immersed within the phase change material, a first set of the heat exchangers defining a PCM charging circuit for charging the phase change material, and a second set of the heat exchangers defining a PCM discharging circuit for discharging the phase change material.

In a feature of this aspect, the second, additional tank module is the lowermost module of the stack and that is received by and supported on top of the base.

In a feature, the assembly comprises plumbing that interconnects in fluid communication one or more PCM circuits of the tank module with one or more PCM circuits of the additional tank module. The assembly preferably comprises valves for controlling the interconnection and may further comprise caps for controlling fluid flow from and to the PCM circuits of the two tank modules.

In a feature, the assembly comprises plumbing that interconnects in fluid communication one or more PCM circuits of each of the two tank modules to components of the electronics module. The assembly preferably comprises valves for controlling the interconnection and may further comprise caps for controlling fluid flow from and to the PCM circuits of the two tank modules.

In a feature, the additional tank module further comprises exterior connection ports comprising a first exterior connection port configured for fluid communication with an inflow of the PCM discharging circuit of the additional tank module, and a second exterior connection port configured for fluid communication with an outflow of the PCM discharging circuit of the additional tank module.

In a feature, the additional tank module further comprises exterior connection ports comprising a first exterior connection port configured for fluid communication with an inflow of the PCM charging circuit of the additional tank module, and a second exterior connection port configured for fluid communication with an outflow of the PCM charging circuit of the additional tank module.

In additional features, the electronics module comprises an onboard charging system and the PCM charging circuit of the additional tank module is connected to the onboard charging system for charging of the PCM of the additional tank module. The additional tank module preferably defines a chase and the assembly comprises plumbing that connects the PCM charging circuit of the additional tank module in fluid communication with the onboard charging system in a closed fluid loop, the PCM charging circuit of the additional tank module being apparatus-enclosed. The onboard charging system may comprise a heat pump; an in-line electric heater located within fluid flow and a recirculation pump; or a heat pump, an in-line electric heater located within fluid flow, and a recirculation pump.

In a feature, the PCM charging circuit of the tank module and the PCM charging circuit of the additional tank module both are connected to the same charging system. In alternative embodiments, the PCM charging circuits are connected to the same charging system internally in parallel; the PCM charging circuits are connected to the same charging system externally in parallel; the PCM charging circuits are connected to the same charging system internally in series; and the PCM charging circuits are connected to the same charging system externally in parallel.

In a feature, the PCM discharging circuit of the tank module and the PCM discharging circuit of the additional tank module both are connected to the same discharging application. In alternative embodiments, the PCM discharging circuits are connected to the same discharging application internally in parallel; the PCM discharging circuits are connected to the same discharging application externally in parallel; the PCM discharging circuits are connected to the same discharging application internally in series; and the PCM discharging circuits are connected to the same discharging application externally in parallel.

In a feature, the PCM discharging circuit of the tank module and the PCM discharging circuit of the additional tank module both are connected to different discharging applications. The PCM discharging circuit of the tank module is connected to a heating application and the PCM discharging circuit of the additional tank module is connected to a different heating application, and more particularly, the PCM discharging circuit of the tank module is connected to a heating application and the PCM discharging circuit of the additional tank module is connected to a cooling application. Preferably, the PMC charging circuit of the tank module is apparatus-enclosed, and the PCM charging circuit of the additional tank module is apparatus-enclosed. Preferably, the two PMC charging circuits are connected by an onboard heat pump, and one of the two PMC charging circuits comprises an onboard electric heater and circulation pump that are located within the electronics module.

Another aspect relates to a method of adding heating or cooling capacity to a modular, stacked thermal battery assembly comprising a plurality of vertically stacked modules. The method comprises the steps of adding an additional tank module to the stack, connecting a PCM charging circuit of the additional tank module to a charging system, and connecting the PCM discharging circuit of the additional tank module to a discharging system.

In a feature, the footprint of the modular, stacked thermal battery assembly remains the same after the additional capacity has been added to the thermal battery assembly.

In a feature, the step of connecting the PCM charging circuit of the additional tank module to a charging system comprises connecting the PCM charging circuit of the additional tank module to the charging system internally in parallel with another PMC charging circuit of another tank module of the thermal battery assembly.

In a feature, the step of connecting the PCM charging circuit of the additional tank module to a charging system comprises connecting the PCM charging circuit of the additional tank module to the charging system internally in series with another PMC charging circuit of another tank module of the thermal battery assembly.

In a feature, the step of connecting the PCM discharging circuit of the additional tank module to a discharging system comprises connecting the PCM discharging circuit of the additional tank module to the discharging system internally in parallel with another PMC discharging circuit of another tank module of the thermal battery assembly.

In a feature, the step of connecting the PCM discharging circuit of the additional tank module to a discharging system comprises connecting the PCM discharging circuit of the additional tank module to the discharging system internally in series with another PMC discharging circuit of another tank module of the thermal battery assembly.

Another aspect relates to a thermal battery apparatus as disclosed herein.

Another aspect relates to a modular, stackable thermal battery assembly as disclosed herein.

Another aspect relates to a hot water heater as disclosed herein.

Another aspect relates to a method of installing a thermal battery assembly as disclosed herein.

Another aspect relates to a method of assembling a thermal battery apparatus as disclosed herein.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

FIG. 3 is a first, left side elevational view of the apparatus of FIG. 1.

FIG. 4 is a second, right side elevational view of the apparatus of FIG. 1.

FIG. 5 is a back elevational view of the apparatus of FIG. 1.

FIG. 6 is a perspective view of the back of the apparatus of FIG. 1, wherein a back cover has been removed.

FIG. 7 is a bottom plan view of the apparatus of FIG. 1.

FIG. 8 is a top plan view of the apparatus of FIG. 1.

FIG. 11 is a first, left side elevational view of the apparatus of FIG. 9.

FIG. 12 is a second, right side elevational view of the apparatus of FIG. 9.

FIG. 13 is a back elevational view of the apparatus of FIG. 9.

FIG. 14 is a bottom plan view of the apparatus of FIG. 9.

FIG. 15 is a top plan view of the apparatus of FIG. 9.

FIG. 68 is an isometric view of a component of each of the apparatus of FIGS. 1, 9 and 16, the component comprising a lid for the electronics module of each of FIGS. 42 and 49.

FIG. 69 is a front elevational view of the lid of FIG. 68.

FIG. 70 is a side elevational view of the lid of FIG. 68.

FIG. 71 is a top plan view of the lid of FIG. 68.

FIG. 72 is bottom plan view of the lid of FIG. 68.

FIG. 77 is a back elevational view of a preferred Modular PCM-TB Apparatus in accordance with one or more aspects and features of the invention, wherein the back cover panels are omitted.

FIG. 78 is a top profile view of the upper tank module of the apparatus of FIG. 77 for the purpose of, inter alia, illustrating external connection ports of the upper tank module.

FIG. 79 is a top profile view of the lower tank module of the apparatus of FIG. 77 for the purpose of, inter alia, illustrating external connection ports of the lower tank module.

FIG. 80 is a schematic diagram of heat exchange circuits of a preferred configuration utilizing the apparatus of FIG. 77.

FIG. 81 is a back elevational view of the preferred Modular PCM-TB Apparatus of FIG. 77, wherein the tank cover panels are shown.

FIG. 82 is another schematic diagram of heat exchange circuits of a preferred configuration utilizing the apparatus of FIG. 77.

FIG. 83 is yet another schematic diagram of heat exchange circuits of a preferred configuration utilizing the apparatus of FIG. 77.

FIG. 84 is a back elevational view of another preferred Modular PCM-TB Apparatus in accordance with one or more aspects and features of the invention, wherein the tank cover panels are omitted.

FIG. 85 is a top profile view of the upper tank module of the apparatus of FIG. 84 for the purpose of, inter alia, illustrating external connection ports of the upper tank module.

FIG. 86 is a top profile view of the lower tank module of the apparatus of FIG. 84 for the purpose of, inter alia, illustrating external connection ports of the lower tank module.

FIG. 87 is a schematic diagram of heat exchange circuits of a preferred configuration utilizing the apparatus of FIG. 84.

FIG. 88 is a back elevational view of another preferred Modular PCM-TB Apparatus in accordance with one or more aspects and features of the invention, wherein the tank cover panels are omitted.

FIG. 89 is a top profile view of the upper tank module of the apparatus of FIG. 88 for the purpose of, inter alia, illustrating external connection ports of the upper tank module.

FIG. 90 is a top profile view of the lower tank module of the apparatus of FIG. 88 for the purpose of, inter alia, illustrating external connection ports of the lower tank module.

FIG. 91 is a schematic diagram of heat exchange circuits of a preferred configuration utilizing the apparatus of FIG. 88.

FIG. 94 is a back elevational view of another preferred Modular PCM-TB Apparatus in accordance with one or more aspects and features of the invention, wherein the tank cover panels are omitted.

FIG. 95 is a top profile view of the upper tank module of the apparatus of FIG. 94 for the purpose of, inter alia, illustrating external connection ports of the upper tank module.

FIG. 96 is a top profile view of the lower tank module of the apparatus of FIG. 94 for the purpose of, inter alia, illustrating external connection ports of the lower tank module.

FIG. 97 is a schematic diagram of heat exchange circuits of a preferred configuration utilizing the apparatus of FIG. 94.

FIG. 108 is a back elevational view of another preferred Modular PCM-TB Apparatus in accordance with one or more aspects and features of the invention, wherein the tank cover panels are omitted.

FIG. 109 is a back elevational view of the preferred Modular PCM-TB Apparatus of FIG. 108, wherein the tank cover panels are shown.

FIG. 110 is a top profile view of the upper tank module of the apparatus of FIG. 108 for the purpose of, inter alia, illustrating external connection ports of the upper tank module.

FIG. 111 is a top profile view of the lower tank module of the apparatus of FIG. 108 for the purpose of, inter alia, illustrating external connection ports of the lower tank module.

FIG. 112 is a schematic diagram of heat exchange circuits of a preferred configuration utilizing the apparatus of FIG. 109, wherein the PCM charging circuit are arranged internally in series.

FIG. 113 is a schematic diagram of heat exchange circuits of a preferred configuration utilizing the apparatus of FIG. 109, wherein the PCM charging circuit are arranged internally in parallel.

FIG. 115 is a back elevational view of another preferred Modular PCM-TB Apparatus in accordance with one or more aspects and features of the invention, wherein the tank cover panels are omitted.

FIG. 116 is a schematic diagram of a preferred PCM charging circuit of an upper tank module of Modular PCM-TB Apparatus in accordance with one or more aspects and features of the invention.

FIG. 117 is a schematic diagram of a preferred PCM discharging circuit of an upper tank module of Modular PCM-TB Apparatus in accordance with one or more aspects and features of the invention.

FIG. 118 is a schematic diagram of a preferred PCM charging circuit of a lower tank module of Modular PCM-TB Apparatus in accordance with one or more aspects and features of the invention.

FIG. 119 is a schematic diagram of a preferred PCM discharging circuit of a lower tank module of Modular PCM-TB Apparatus in accordance with one or more aspects and features of the invention.

FIG. 120 is a table illustrating open/closed states of the valves shown in the preferred Modular PCM-TB Apparatus of FIG. 115.

FIG. 121 is a table illustrating connected/capped states of the external connection ports shown in the preferred Modular PCM-TB Apparatus of FIG. 115.

DETAILED DESCRIPTION

Figure 1:
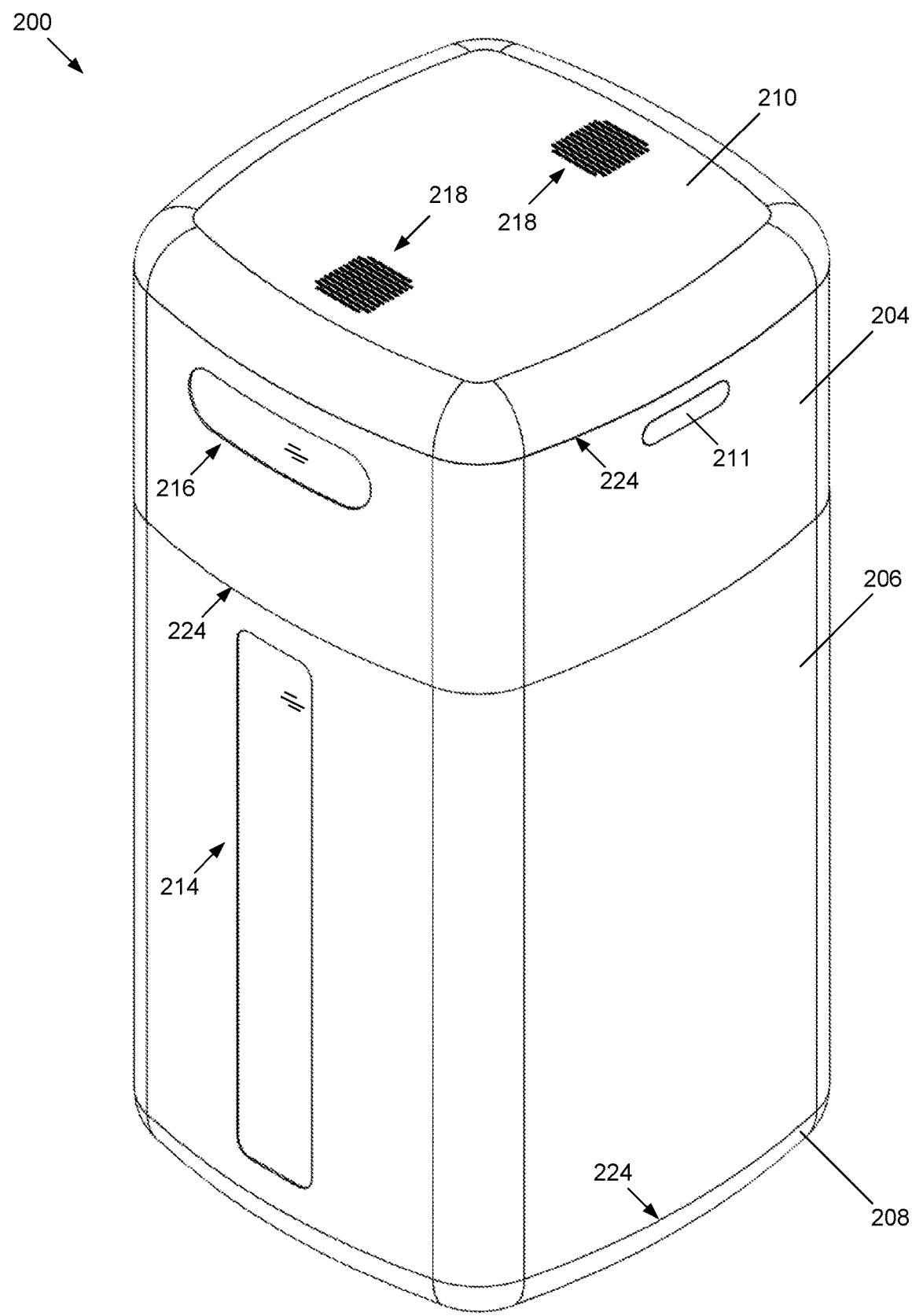
FIG. 1 is a perspective view of a preferred modular, PCM-based thermal battery apparatus (hereinafter "Modular PCM-TB Apparatus") in accordance with one or more aspects and features of the invention.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

Figure 2:
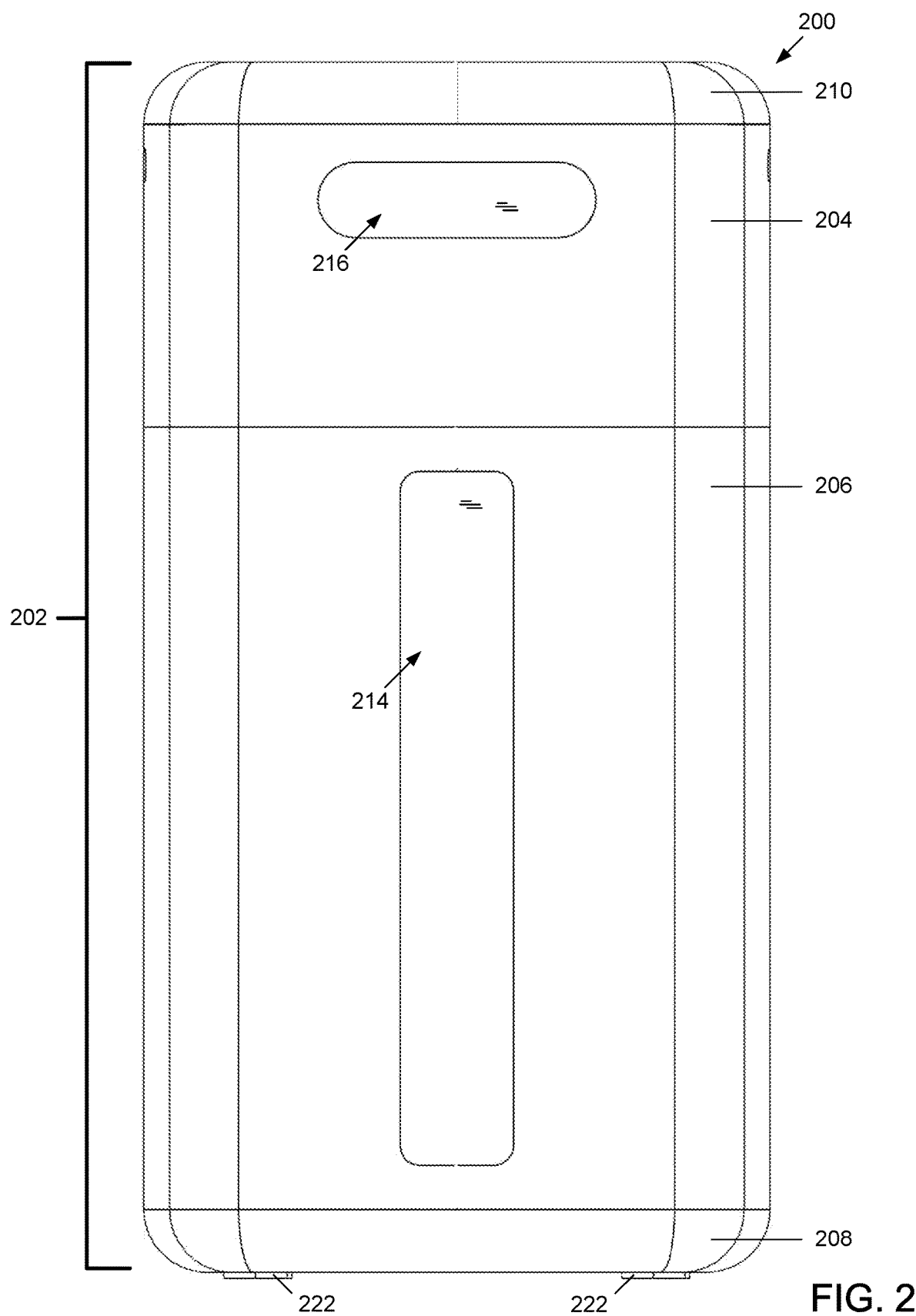
FIG. 2 is a front elevational view of the apparatus of FIG. 1.

FIGS. 1-8 show a first preferred modular, PCM-based thermal battery apparatus 200 or "Modular PCM-TB Apparatus" in accordance with one or more aspects and features of the invention. In this respect, FIG. 1 is a perspective view of the apparatus 200; FIG. 2 is a front elevational view of the apparatus 200; FIG. 3 is a first, left side elevational view of the apparatus 200; FIG. 4 is a second, right side elevational view of the apparatus 200; FIG. is a back elevational view of the apparatus 200; FIG. 6 is a perspective view of the back of the apparatus 200, wherein a back cover has been removed; FIG. 7 is a bottom plan view of the apparatus 200; and FIG. 8 is a top plan view of the apparatus 200.

The apparatus 200 comprises stackable modules. As shown, a stack 202 of the apparatus 200 comprises two modules: an electronics module 204, and a tank module 206. These modules are supported by a base 208 that defines a bottom of the stack 202. A detachable lid 210 covers the electronics module 204 and encloses and protects electronic that are contained within the module 204. The lid 210 defines the top of the stack 202.

The tank module 206 comprises a phase change material (PCM) and a heat exchanger assembly. The PCM may comprise a paraffin, salt hydrate, fatty acids, fatty alcohols, fatty esters and the likes. The PCM preferably is a bio-based PCM. The heat exchanger assembly comprises a plurality of heat exchangers that are immersed within the phase change material and that are configured to define a PCM charging circuit for charging the phase change material, and a PCM discharging circuit for discharging the phase change material. The charging may comprise heating the PCM material to or above a phase change temperature, or cooling the PCM material to or below a phase change temperature, depending on the intended use of the PCM material for either heating or cooling during discharging. The PCM charging circuit preferably comprises a fluid flow arrangement of the heat exchangers that is in parallel. An exemplary PCM charging circuit arranged in parallel 1160 for a thermal battery TB1 is shown in FIG. 116. In contrast, the PCM discharging circuit preferably comprises a fluid flow arrangement that is in series. An exemplary PCM discharging circuit arranged in series 1170 for the thermal battery TB1 is shown in FIG. 117. Nonetheless, it is contemplated that, within the broader scope of the invention, the PCM charging circuit comprises a fluid flow arrangement that is in series like discharging circuit 1170, and that the PCM discharging circuit comprises a fluid flow arrangement that is arranged in parallel like charging circuit 1160. For further details regarding such thermal energy batteries comprising bio-based PCMs, heat exchangers, and PCM charging and discharging circuits, reference is here made to U.S. patent application 63/445,715, filed Feb. 14, 2023, and to international patent application PCT/US2023/13069, filed Feb. 14, 2023, and the publication thereof, both of which are incorporated herein by reference.

With reference to FIGS. 5 and 6, the tank module 206 comprises exterior connection ports 212 preferably located on the back of the tank module 206 for fluid flow into and out of the apparatus 200. A first pair of the exterior connection ports 212 preferably handle the inflow and outflow of the PCM charging circuit, and a second pair of the exterior ports 212 preferably handle the inflow and outflow of the PCM discharging circuit.

Preferably sensors are contained within the tank module 206 for determining local temperatures of the phase change material, from which a measure of charge may be determined. These sensors may be wired or configured for wireless communications. The tank module 206 further preferably includes a lighting display panel or other visual display 214 that indicates the measure of charge. For instance, a green light, a yellow light, and a red light may be displayed indicating a level of charge of the tank. Other temperatures also may be determined with sensors, including temperatures of fluid at various locations in the charging and discharging circuits and the heat exchangers of the tank module 206.

The measure of charge preferably is determined by electronic components contained in the electronics module 204. These components preferably comprise a controller or processor with memory and software by which the temperature readings are received and which may process the readings for determining the measure of charge. Alternatively, the temperature data received may be communicated from the apparatus 200 for processing, in which scenario the electronics preferably comprise a transceiver. The communications may comprise Bluetooth or Wi-Fi communications. Power is supplied to the electronics within the electronics module 204 by battery or by a power cord that plugs into a conventional wall outlet.

The electronics module 204 preferably comprises a display panel or control panel 216 for communicating information to a user. For example, in implementations in which the apparatus 200 is used to heat water, a temperature of the water as output from the apparatus 200 may be indicated via the panel 216. There preferably also are interactive controls.

By being contained within the electronics module 204, the electric components are separate from the PCM in the tank module 206 and insulated from the heat of the PCM when it is charged.

The lid 210 is configured to fit onto a rim of the housing of the electronics module 204. The lid preferably snap fits onto the rim of the housing of the electronics module 204, with springy detent portions 211 of the lid 210 being received within openings located in side walls of the housing of the electronics module 204 for removably latching the lid 210 to the housing of the electronics module 204. The lid 210 further preferably comprises openings 218 for venting of the interior space of the electronics module when attached in covering relation thereto. Two groups of openings 218 comprising vents are shown, for example, in FIGS. 1 and 8. One or more electric fans also may be included for venting and cooling of electronic components housed in the electronics module 204.

The base 208 is configured to receive a modular tank and support the stack of the apparatus. As shown, the base comprises a recess 220 (see FIGS. 73 and 75) for receiving a lower portion of the tank module therein. The base preferably is configured to collect and contain condensate and liquids that may run down from the stack and, preferably, is wired with a safety switch for creating an alert regarding a possible leak in the stack when a sufficient amount of condensate or liquid is detected in the containment area of the base 208. The base 208 further comprises feet 222 that inhibit slipping of the apparatus on a smooth floor. The feet 222 preferably comprise non-slip surfaces and may comprise non-slip pads. Preferably, the base 208 serves as a floor pan and captures any small amount of fluid that might escape from a tank module, whether during install, maintenance, or otherwise.

It will be appreciated that the apparatus 200 utilizes a stackable, modular design. In this respect, the electronics module 204 is configured to stack on top of the tank module 206, and the tank module 206 in turn is configured to be received on and supported by the base 208.

Furthermore, an additional tank module may be added to the stack or a different sized tank module may be interchanged with an existing tank module. Similarly, an additional electronics module may be added. In this regard, the electronics module 204 is configured to receive another electronics module thereon in stacked, covering relation, if another is desired, with the detachable lid 210 fitting on the housing of and covering the topmost electronics module. The tank module 206 is configured in like manner to receive another tank module thereon, with the electronics module 204 then stacking on top of the second tank module; and the tank module 206 is configured in like manner to be stacked itself on top of another tank module, with the other tank module being received on and supported by the base and with the electronics module 204 remaining stacked on top of the tank module 206. In the stacked configuration, the lid, the electronics module(s), the tank module(s), and the base collectively define a continuous exterior surface with seams defined therebetween, as shown for example in FIG. 1, illustrating seams 222 in apparatus 200.

The apparatus 200 preferably comprises a detachable panel 224 that snap-fits within channels on a back of the tank module 206 in covering relation to a recessed area 226 that is defined in the back surface of the tank module 206. The panel 224 is shown in FIG. 5 and omitted in FIG. 6 to reveal the recessed area 226. The cover panel 224 and recessed area 226 preferably define a space within which plumbing may be installed for interconnecting one or more flows of stacked tanks in a Modular PCM-TB Apparatus, as discussed in detail below. The plumbing may comprise pipes, hoses, fittings, adapters, valves, and servomechanism for controlling the valves if not manually operated. A similar recessed area 326 is provided in tank module 300, discussed in detail below.

The walls of the modules preferably are constructed from a material that is resistive to thermal energy transfer, i.e., a thermally insulating material. In this regard, the components defining the walls of the modules preferably are molded or printed and CNC processed. Additionally, a tank module preferable includes a double-walled/double-insulated construction for thermally insulating the heat exchangers and bio-based PCM. The double-walled construction also preferably is utilized in not only the sidewalls but also the bottom wall of a tank module. The bottom of an electronics module also preferably includes a double-wall design for thermal insulation, as the electronics module serves as a cover for the top opening of the topmost tank in a stack. The double-walled design that preferably utilized in each tank module is best shown in the cross-sectional view of the tank module of FIG. 35, described in detail below.

Figure 9:
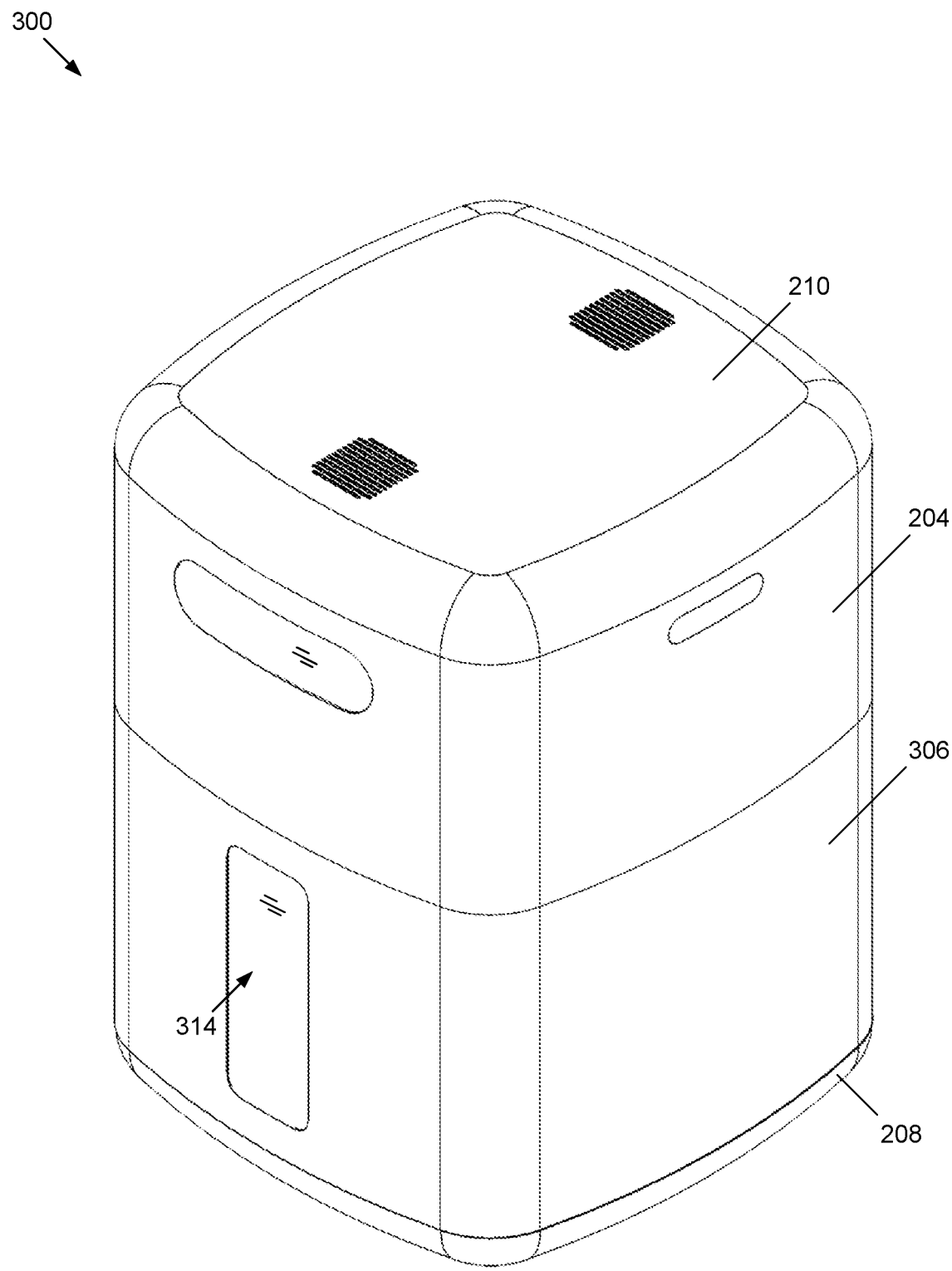
FIG. 9 is a perspective view of another preferred Modular PCM-TB Apparatus in accordance with one or more aspects and features of the invention.
Figure 10:
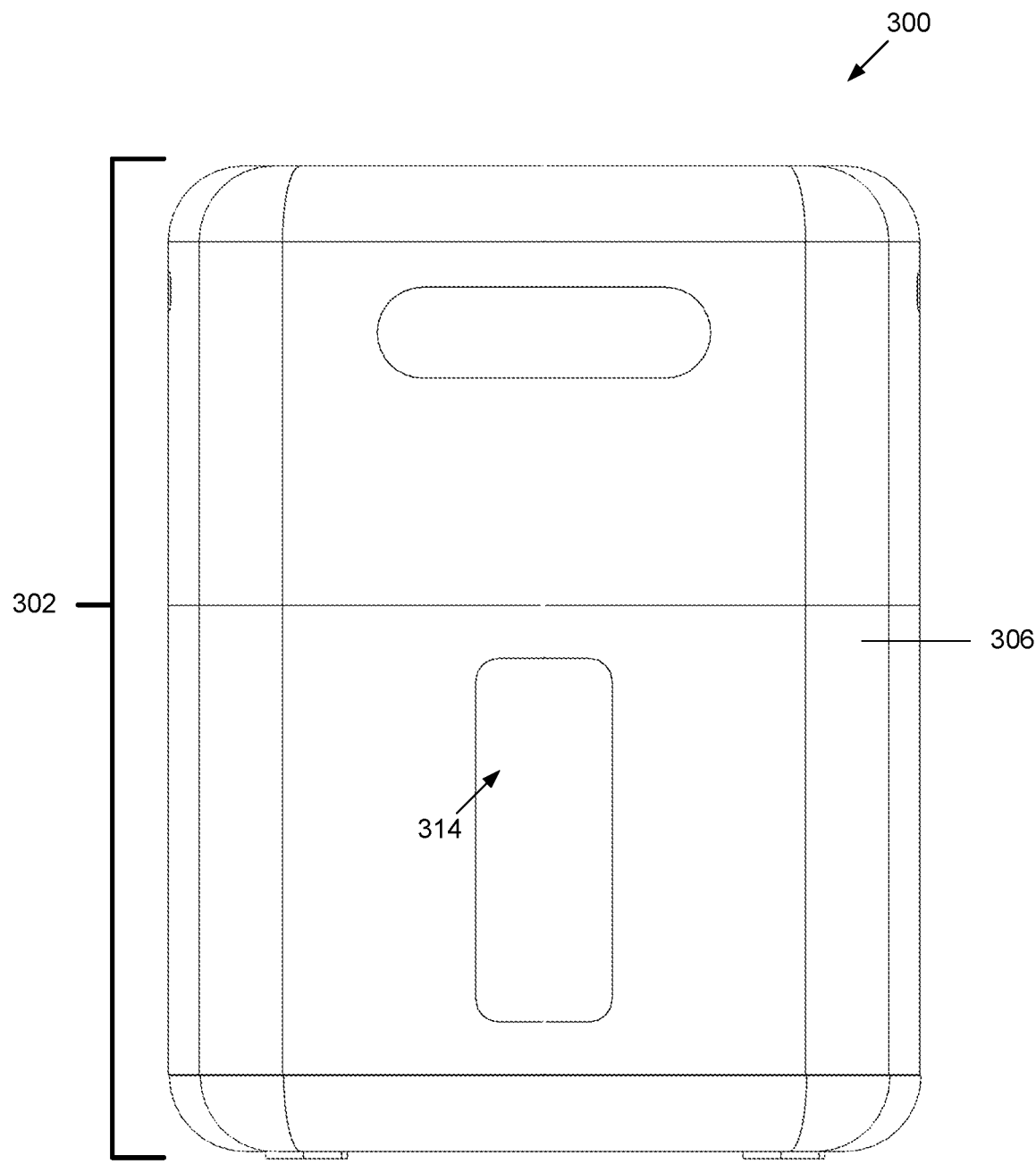
FIG. 10 is a front elevational view of the apparatus of FIG. 9.

FIGS. 9-15 show a second preferred Modular PCM-TB Apparatus 300 in accordance with one or more aspects and features of the invention. In this respect, FIG. 9 is a perspective view of the apparatus 300; FIG. 10 is a front elevational view of the apparatus 300; FIG. 11 is a first, left side elevational view of the apparatus 300; FIG. 12 is a second, right side elevational view of the apparatus 300; FIG. 13 is a back elevational view of the apparatus 300; FIG. 14 is a bottom plan view of the apparatus 300; and FIG. 15 is a top plan view of the apparatus 300.

The apparatus 300 is similar to apparatus 200 and like modules and components will not be repeated, reference instead now being made to the disclosure above with regard to apparatus 200. Accordingly, primary differences between apparatus 300 and apparatus 200 will now be described.

The stack 302 of the apparatus 300 comprises tank module 306, which is similar in design but smaller in height than tank module 206. The display 314 is also smaller in height, as is the back cover panel 324. Contrasting apparatus 300 and apparatus 200 reveals the benefit of the modularity of the design; apparatus 300 is arrived at by interchanging the tank module 206 with the tank module 306.

As a result of the smaller size, tank module 306 contains less PCM and therefore has a lesser energy storage capacity when used in heating implementations, such as a tankless water heater. As an example, whereas apparatus 200 having a single tank module 206 in its stack might have an energy consumption of 20 kW in its operation when using an electric heat source in its PCM charging circuit, apparatus 300 having a single tank module 306 in its stack then might have an energy consumption of 10 kW in its operation when using an electric heat source in its PCM charging circuit.

Figure 16:
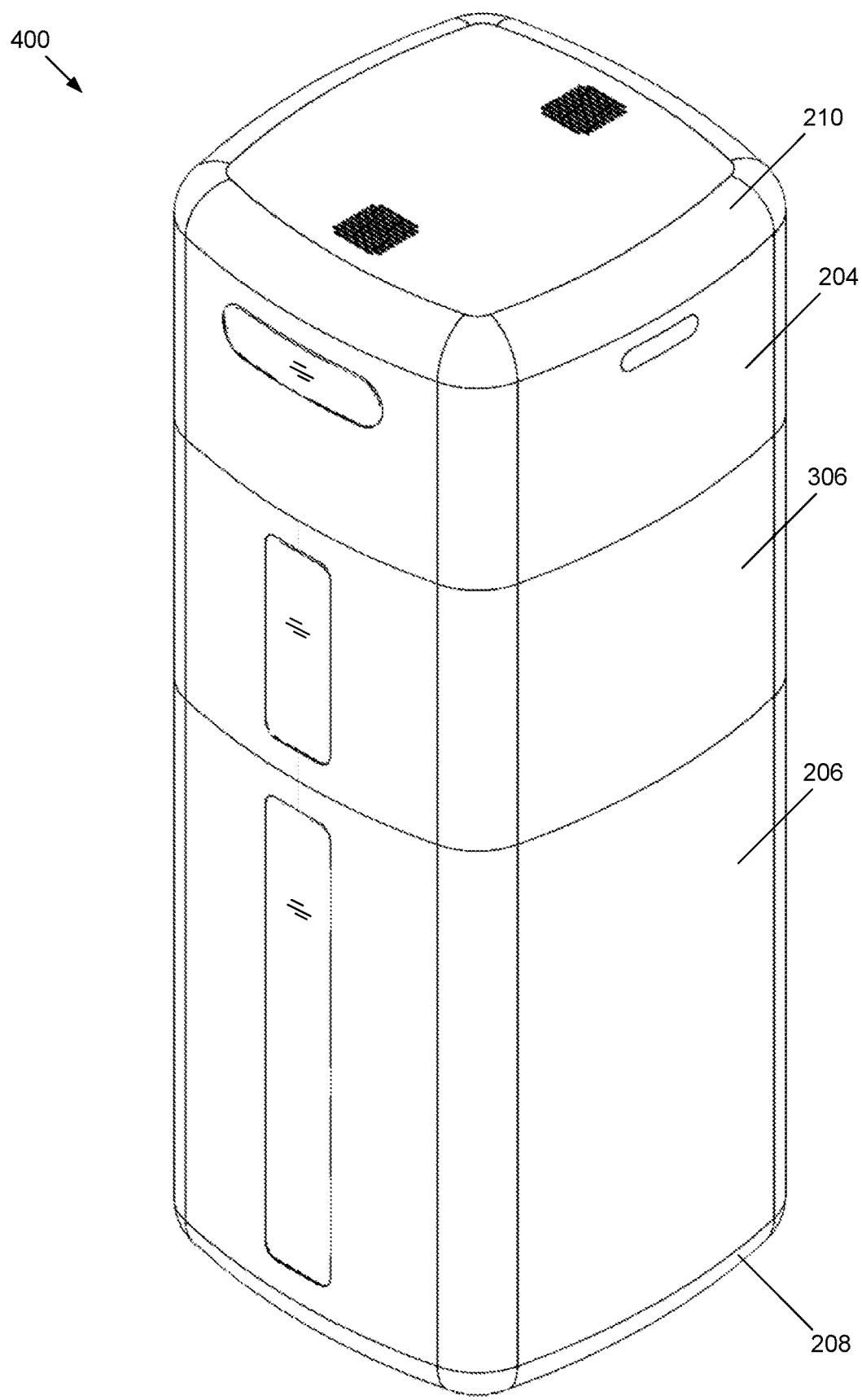
FIG. 16 is a perspective view of another preferred Modular PCM-TB Apparatus in accordance with one or more aspects and features of the invention.
Figure 17:
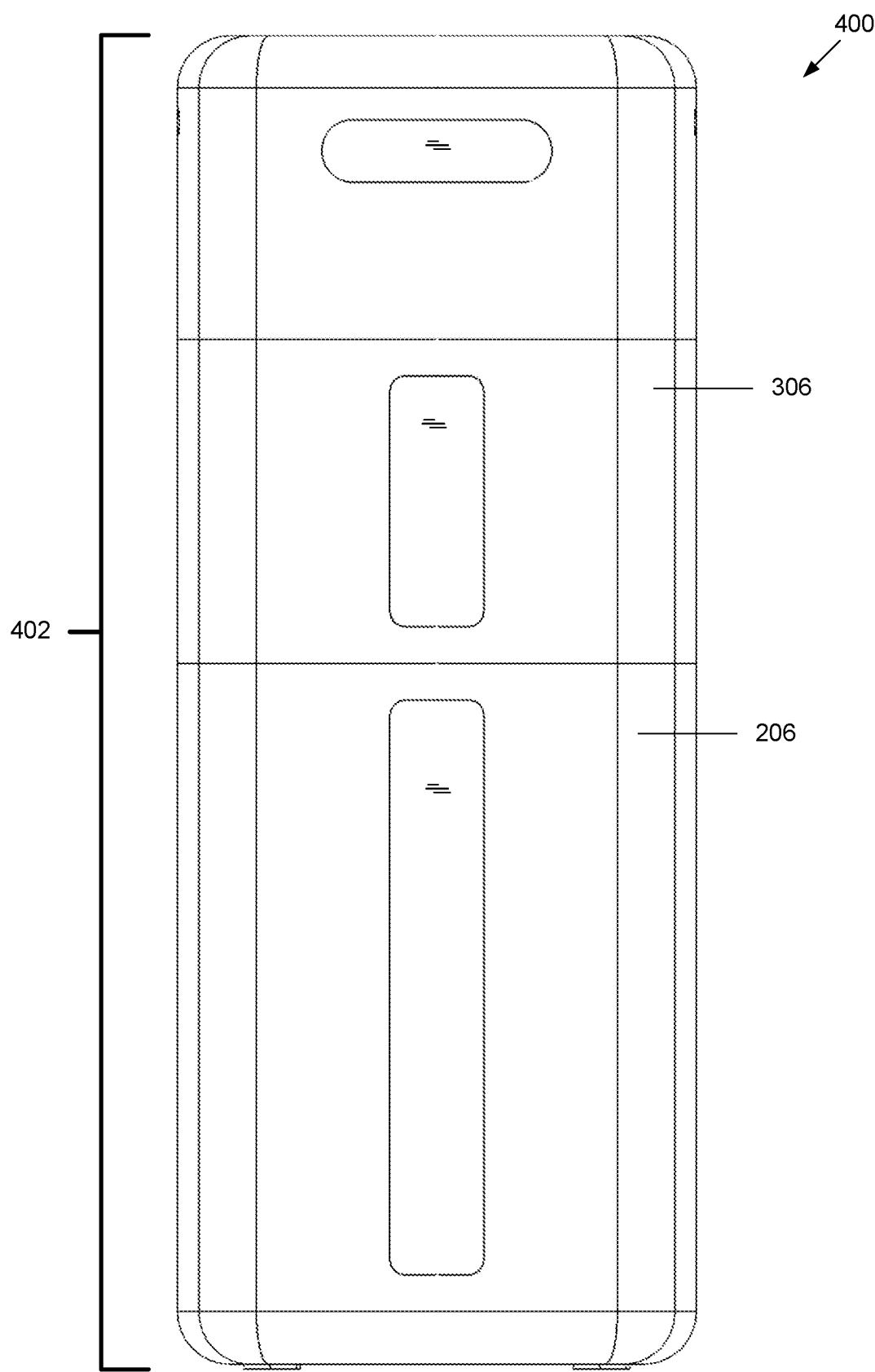
FIG. 17 is a front elevational view of the apparatus of FIG. 16.
Figure 21:
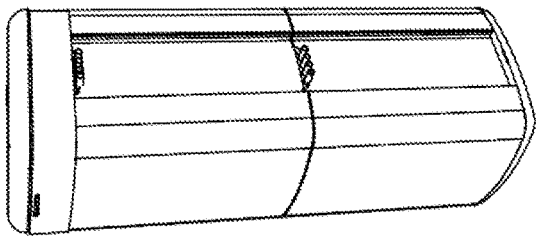
FIG. 21 is a perspective view of the back of the apparatus of FIG. 16.
Figure 20:
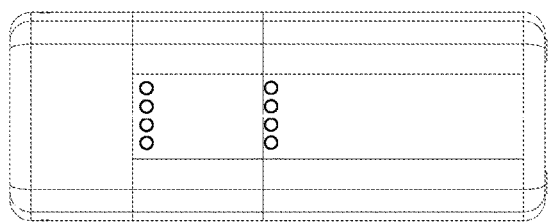
FIG. 20 is a back elevational view of the apparatus of FIG. 16.
Figure 19:
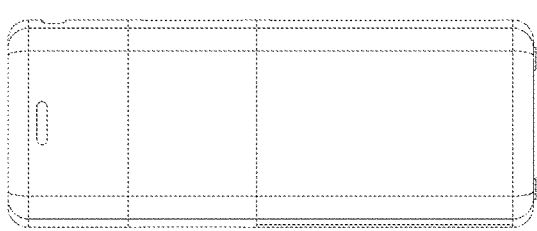
FIG. 19 is a second, right side elevational view of the apparatus of FIG. 16.
Figure 18:
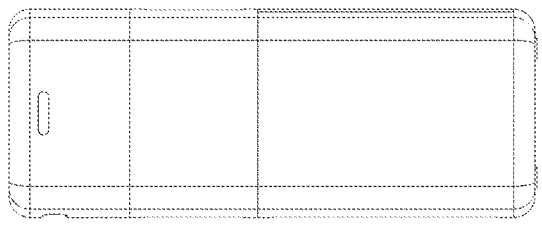
FIG. 18 is a first, left side elevational view of the apparatus of FIG. 16.
Figure 23:
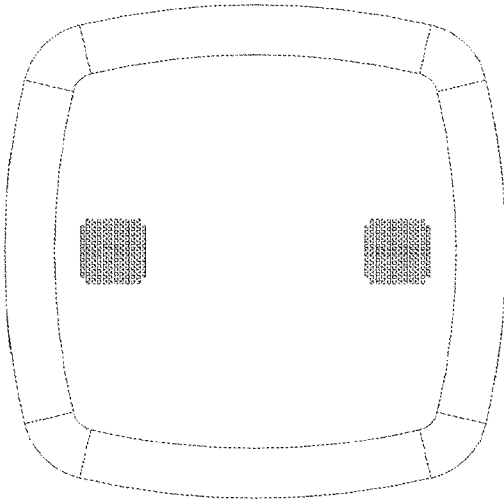
FIG. 23 is a top plan view of the apparatus of FIG. 16.
Figure 22:
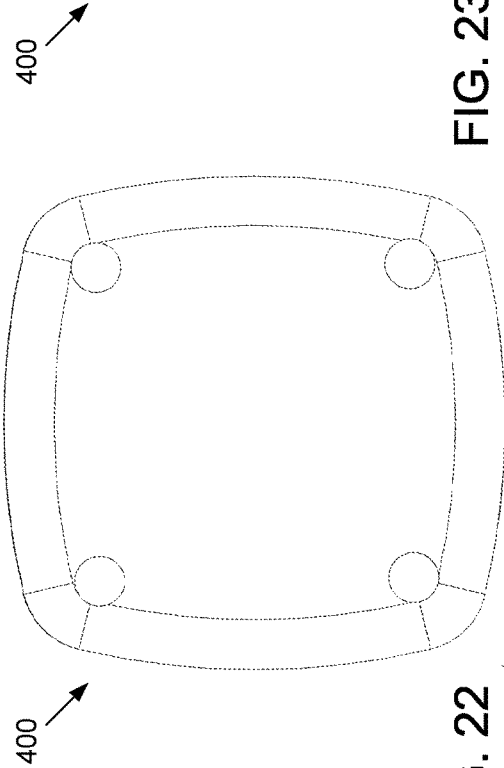
FIG. 22 is a bottom plan view of the apparatus of FIG. 16.
Figure 24:
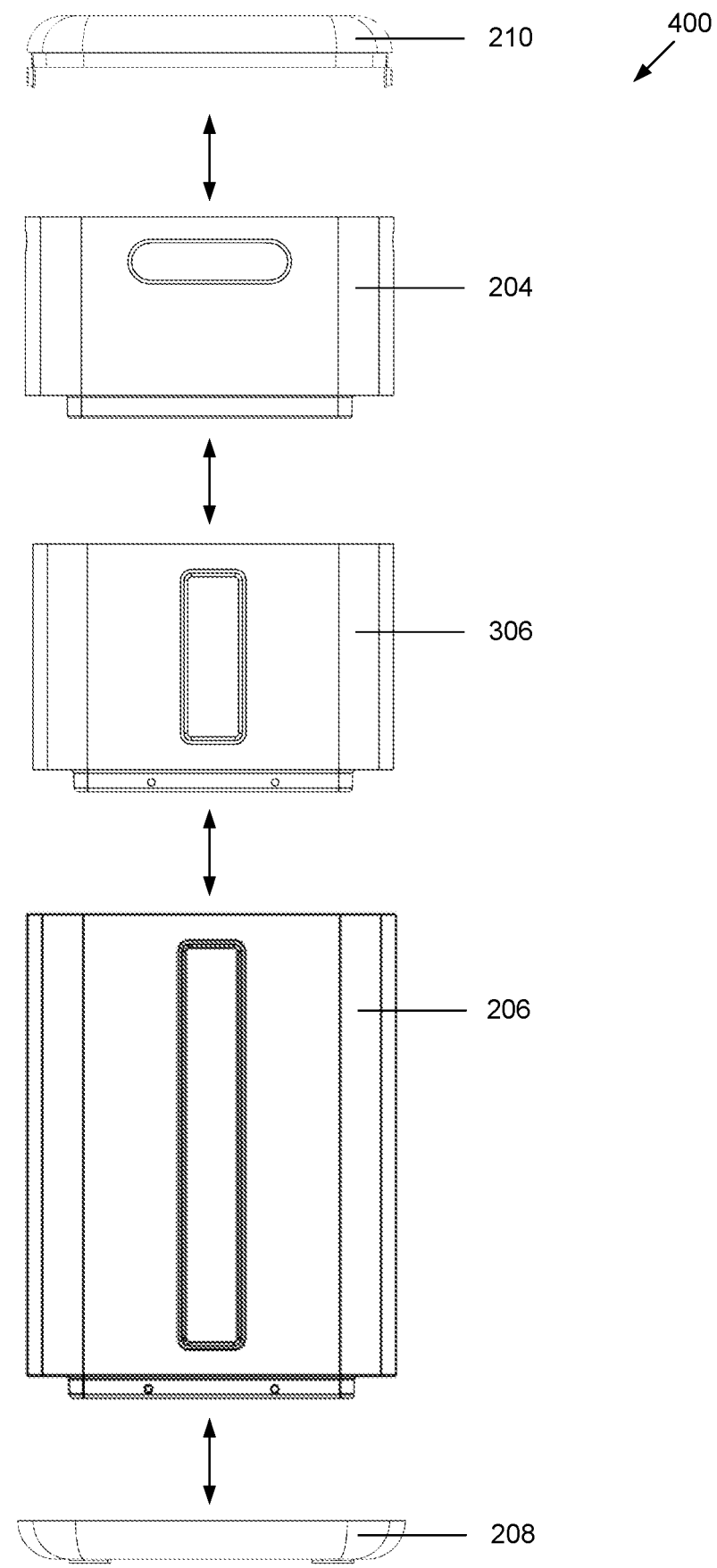
FIG. 24 is an exploded, front view of the apparatus of FIG. 17.
Figure 25:
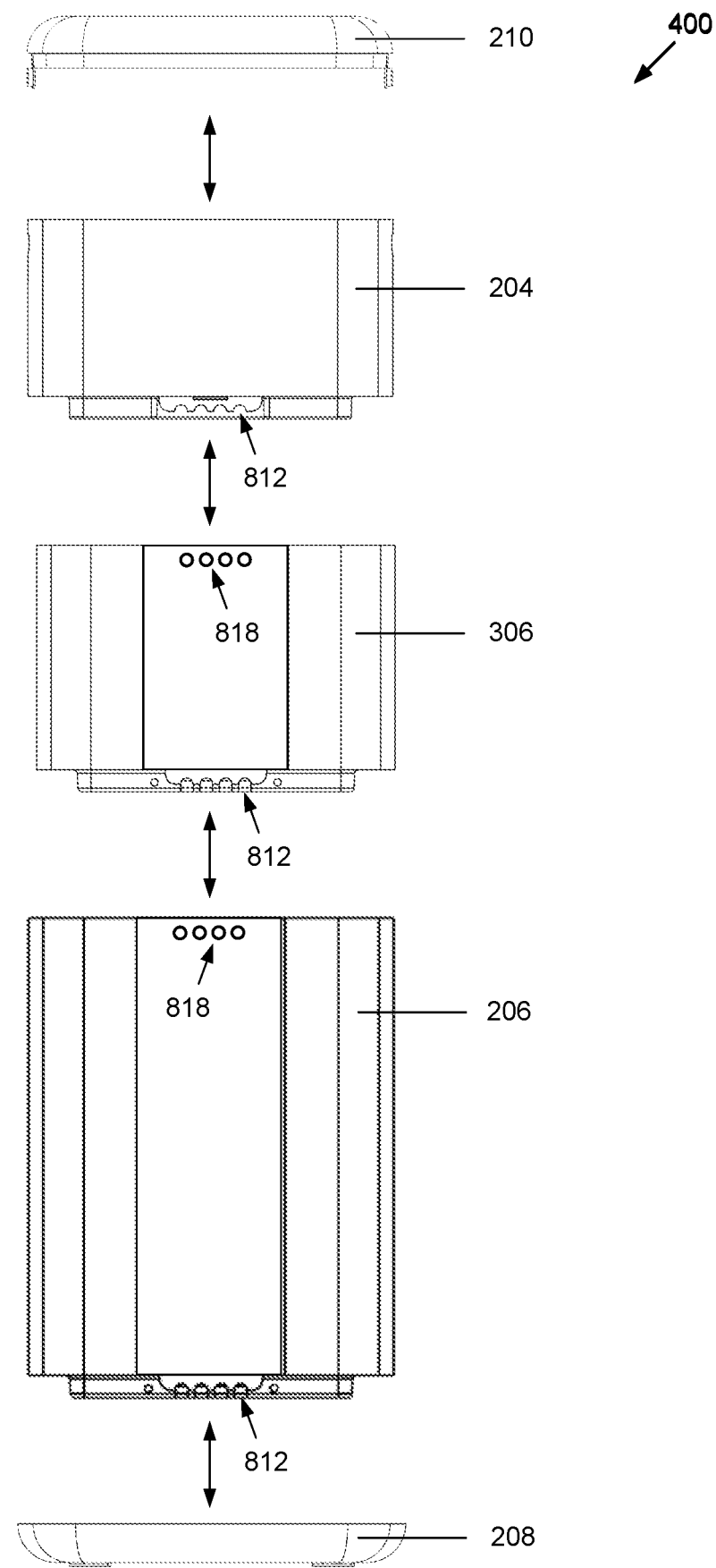
FIG. 25 is an exploded, back view of the apparatus of FIG. 17.
Figure 26:
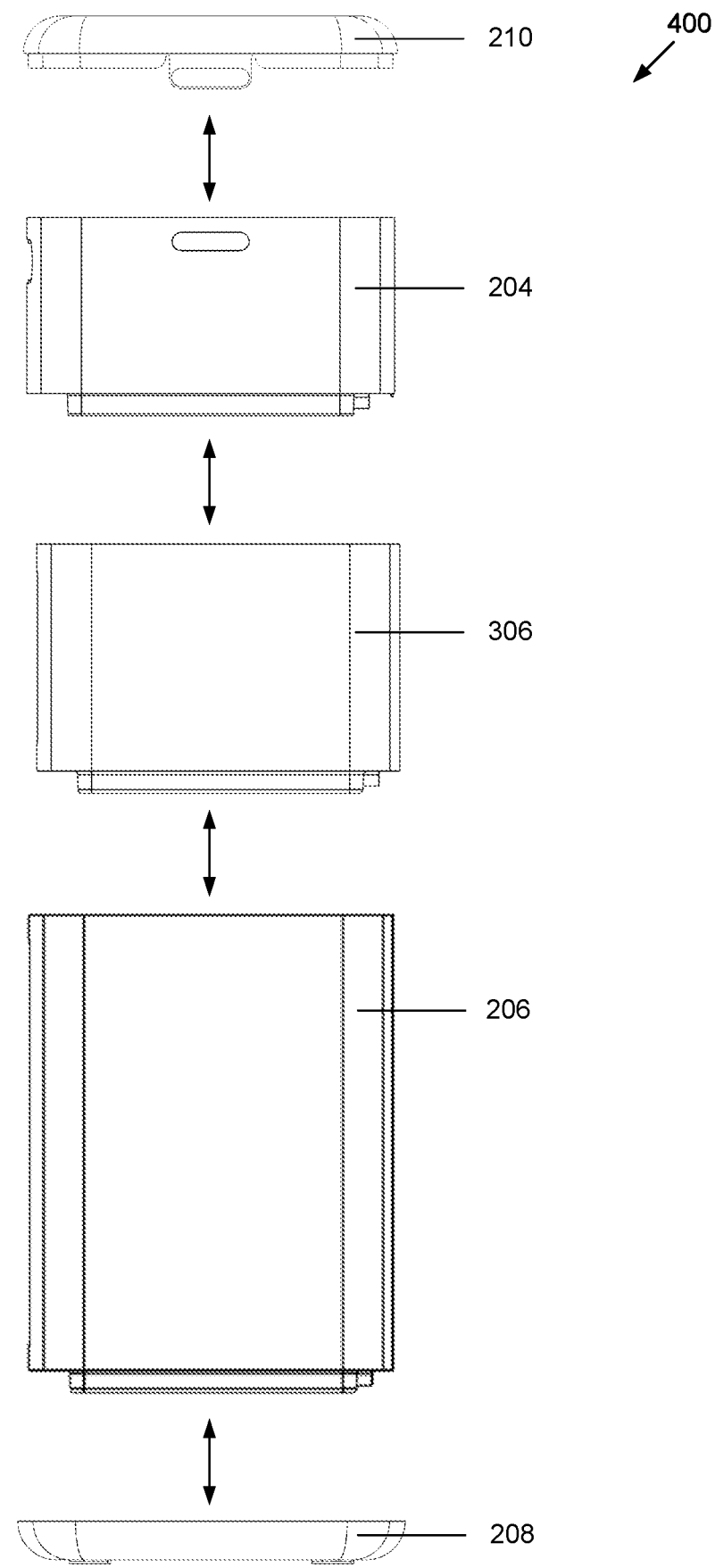
FIG. 26 is an exploded, side view of the apparatus of FIG. 17.

FIGS. 16-23 show a third preferred Modular PCM-TB Apparatus 400 in accordance with one or more aspects and features of the invention. In this respect, FIG. 16 is a perspective view of the apparatus 400; FIG. 17 is a front elevational view of the apparatus 400; FIG. 18 is a first, left side elevational view of the apparatus 400; FIG. 19 is a second, right side elevational view of the apparatus 400; FIG. 20 is a back elevational view of the apparatus 400; FIG. 21 is a perspective view of the back of the apparatus 400; FIG. 22 is a bottom plan view of the apparatus 400; FIG. 23 is a top plan view of the apparatus 400; FIG. 24 is an exploded, front view of the apparatus 400; FIG. 25 is an exploded, back view of the apparatus 400; and FIG. 26 is an exploded, side view of the apparatus 400.

The apparatus 400 is similar to apparatus 200,300 and like modules and components will not be repeated, reference instead now being made to the disclosure above with regard to apparatus 200,300. Accordingly, primary differences between apparatus 300 and apparatus 200 will now be described.

The stack 402 of the apparatus 400 comprises both tank module 206 and tank module 306, and apparatus 300 is arrived at by adding tank module 306 to the stack 202 of apparatus 200, or by adding tank module 206 to the stack 302 of apparatus 300. In stacking, a lower portion of an upper module or component preferably is received within the lower module or component on which the upper module or component is stacked.

Moreover, when stacking a module on top of a tank module, the lower portion of the upper module that is received within the lower tank module preferably includes contoured portions 812 that mate with contoured portions 814 of the lower tank module to define openings 816 from an interior of the tank for passing of the connection ports and/or plumbing, including tubes, pipes, and hoses. Access to the openings 816 is facilitated by one or more corresponding openings 818 in back cover panels of the tank modules.

As a result of the modular stackability of the apparatus assembly, the tank modules of apparatus 400 collectively contain more PCM and therefore have a higher energy storage capacity than apparatus 200,300 when used in heating implementations, such as a tankless water heater. As an example, whereas apparatus 200 having a single tank module 206 in its stack might have an energy consumption of 20 kW in its operation when using an electric heat source in its PCM charging circuit, and apparatus 300 having a single tank module 306 in its stack might have an energy consumption of 10 kW in its operation when using an electric heat source in its PCM charging circuit, apparatus 400 having both tank modules 206,306 in its stack then might have an energy consumption of 30 kW in its operation when using an electric heat source in its PCM charging circuits.

Housing for modules and components of preferred Modular PCM-TB Apparatus are individually shown in FIGS. 27-76.

Figure 30:
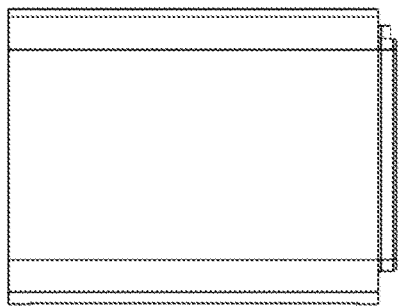
FIG. 30 is a first, left side elevational view of the housing of FIG. 27.
Figure 31:
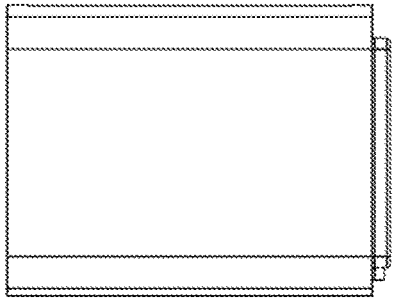
FIG. 31 is a second, right side elevational view of the housing of FIG. 27.
Figure 33:
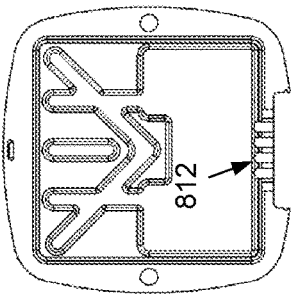
FIG. 33 is a bottom plan view of the housing of FIG. 27.
Figure 28:
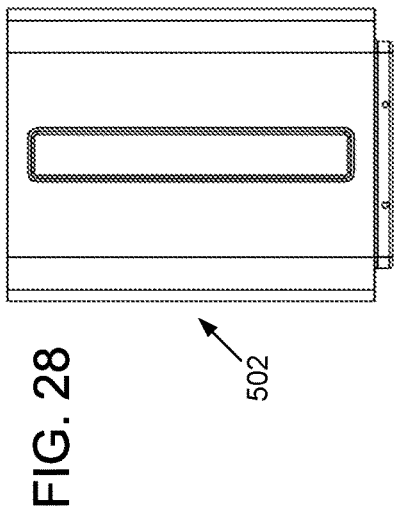
FIG. 28 is a front elevational view of the housing of FIG. 27.
Figure 29:
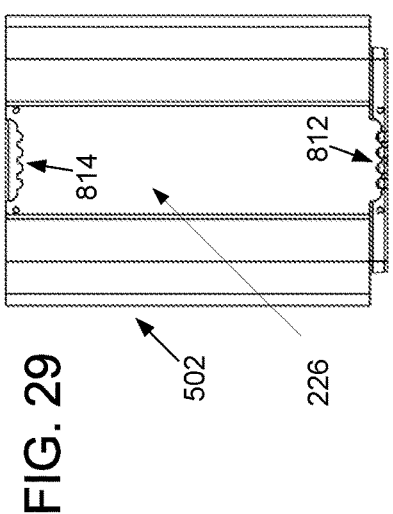
FIG. 29 is a back elevational view of the housing of FIG. 27.
Figure 32:
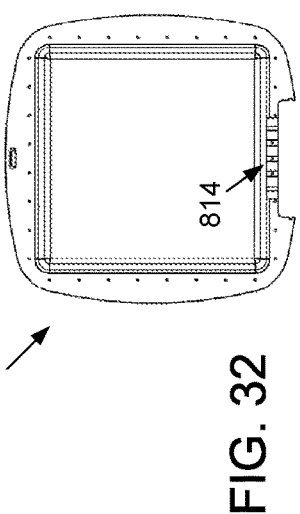
FIG. 32 is a top plan view of the housing of FIG. 27.
Figure 27:
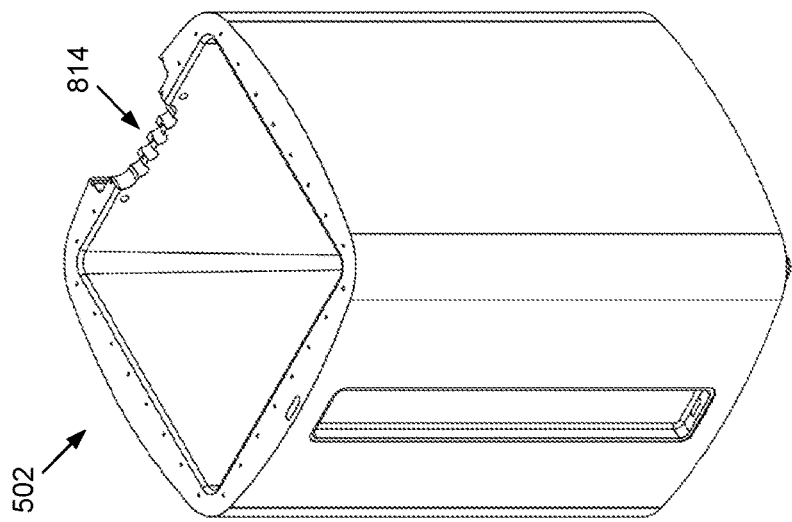
FIG. 27 is an isometric view of a housing of each of the tank modules of FIGS. 1 and 16.

In this regard, FIGS. 27-33 illustrate housing 502 of tank module 206. Specifically, FIG. 27 is an isometric view of the housing 502; FIG. 28 is a front elevational view of the housing 502; FIG. 29 is a back elevational view of the housing 502; FIG. 30 is a first, left side elevational view of the housing 502; FIG. 31 is a second, right side elevational view of the housing 502; FIG. 32 is a top plan view of the housing 502; and FIG. 33 is a bottom plan view of the housing 502.

Figure 38:
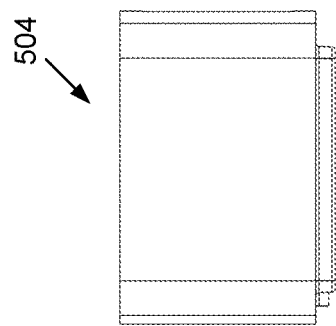
FIG. 38 is a first, left side elevational view of the housing of FIG. 34.
Figure 39:
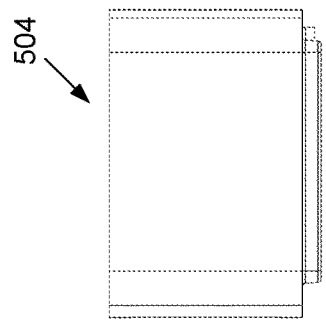
FIG. 39 is a second, right side elevational view of the housing of FIG. 34.
Figure 41:
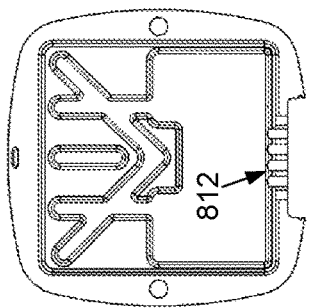
FIG. 41 is a bottom plan view of the housing of FIG. 34.
Figure 36:
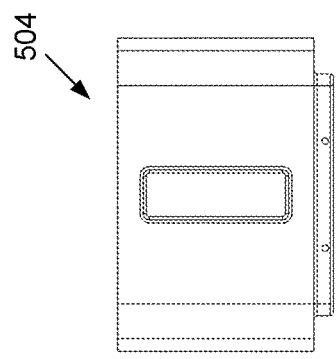
FIG. 36 is a front elevational view of the housing of FIG. 34.
Figure 37:
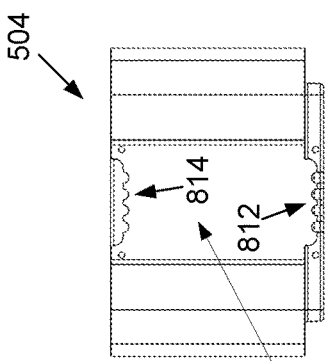
FIG. 37 is a back elevational view of the housing of FIG. 34.
Figure 40:
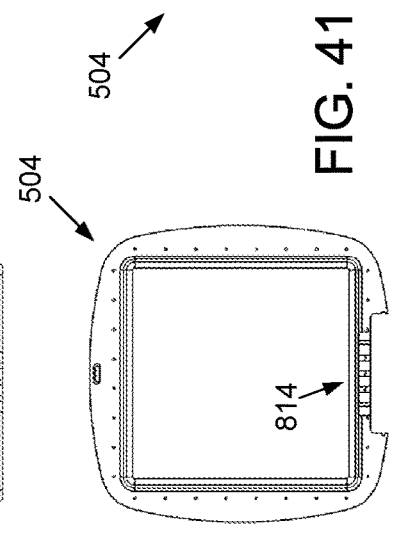
FIG. 40 is a top plan view of the housing of FIG. 34.
Figure 34:
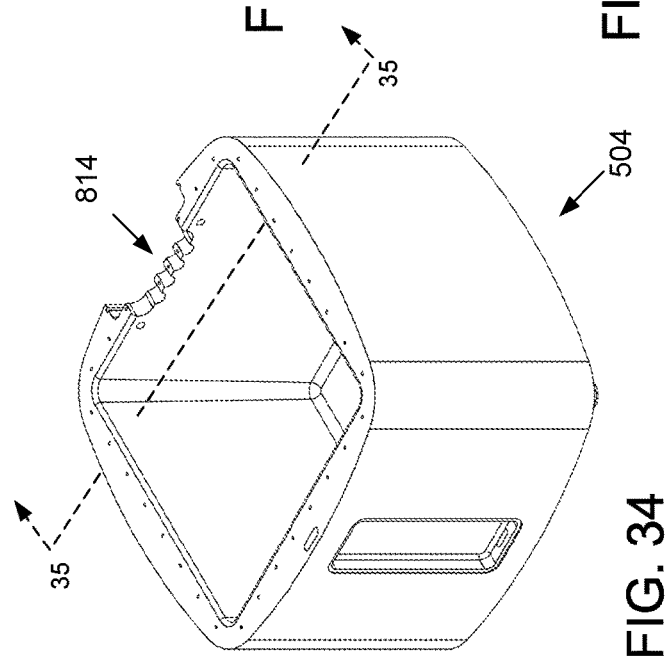
FIG. 34 is an isometric view of a housing of the tank modules of FIGS. 9 and 16.
Figure 35:
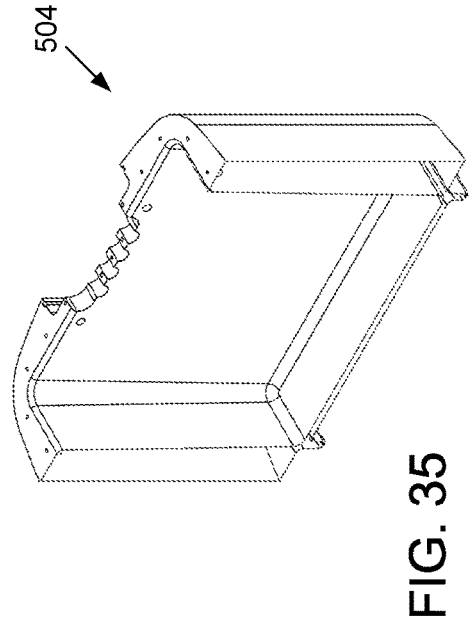
FIG. 35 is a cross-sectional view of the housing of FIG. 34 taken along the line 35-35 shown in FIG. 34.

FIGS. 34-41 illustrate housing 504 of tank module 306. Specifically, FIG. 34 is an isometric view of the housing 504; FIG. 35 is a cross-sectional view of the housing 504 taken along the line 35-35 of FIG. 34; FIG. 36 is a front elevational view of the housing 504; FIG. 37 is a back elevational view of the housing 504; FIG. 38 is a first, left side elevational view of the housing 504; FIG. 39 is a second, right side elevational view of the housing 504; FIG. 40 is a top plan view of the housing 504; and FIG. 41 is a bottom plan view of the housing 504.

Figure 45:
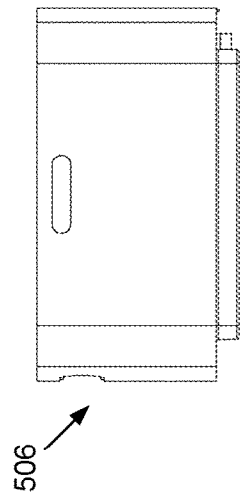
FIG. 45 is a first, left side elevational view of the housing of FIG. 42.
Figure 46:
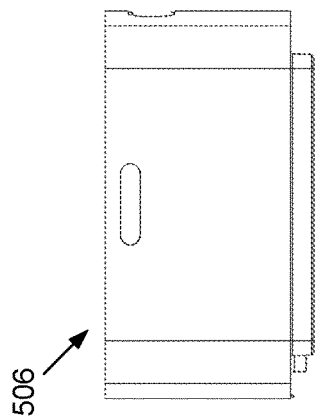
FIG. 46 is a second, right side elevational view of the housing of FIG. 42.
Figure 48:
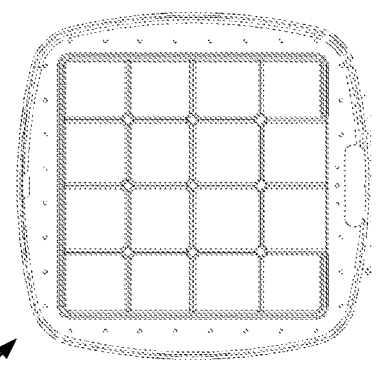
FIG. 48 is a bottom plan view of the housing of FIG. 42.
Figure 43:
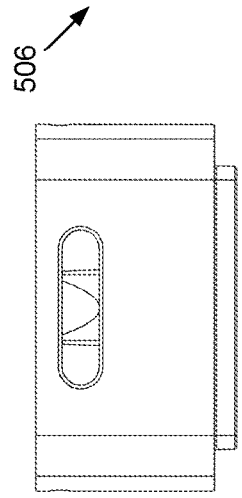
FIG. 43 is a front elevational view of the housing of FIG. 42.
Figure 44:
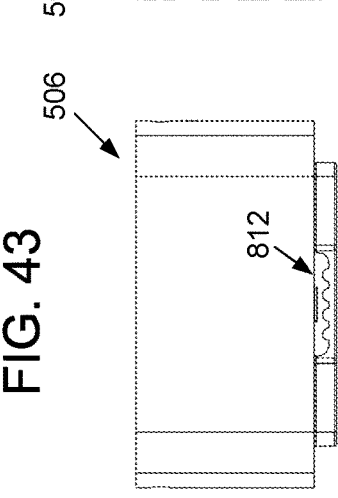
FIG. 44 is a back elevational view of the housing of FIG. 42.
Figure 47:
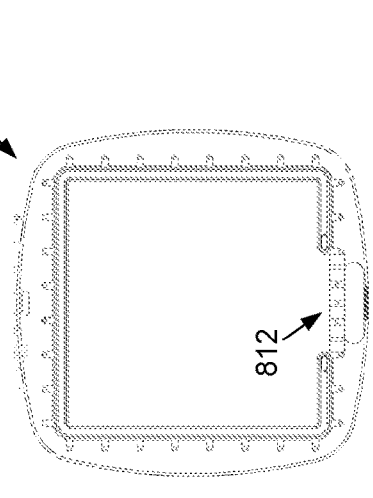
FIG. 47 is a top plan view of the housing of FIG. 42.
Figure 42:
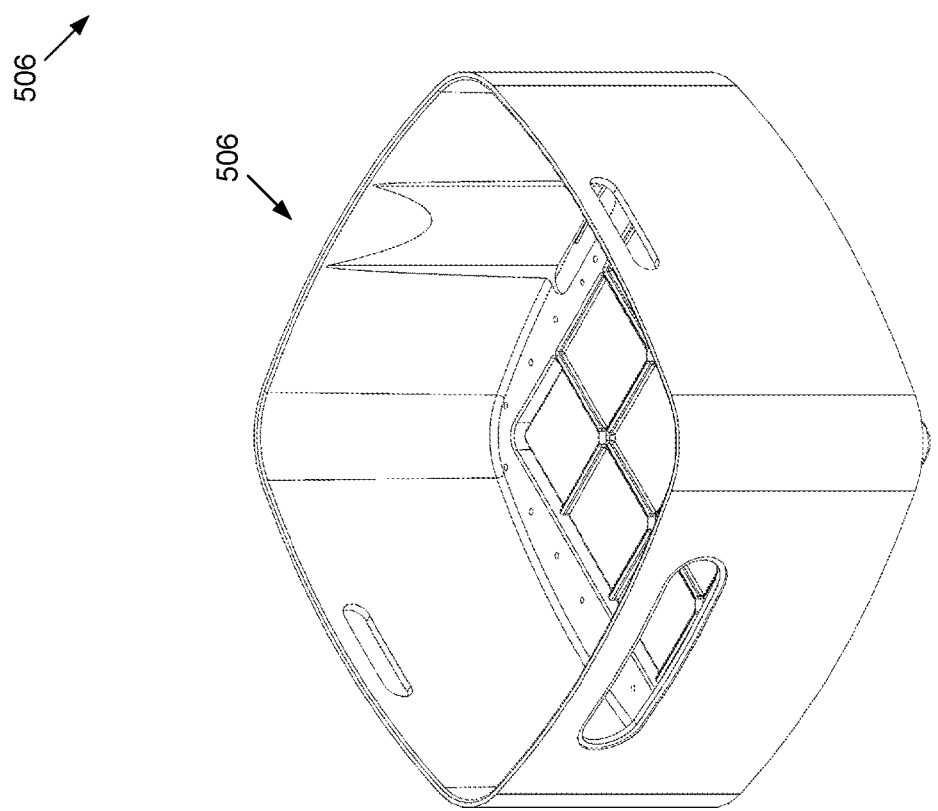
FIG. 42 is an isometric view of a housing of the electronics module of each of the apparatus of FIGS. 1, 9, and 16.

FIGS. 42-48 illustrate housing 506 of electronics module 204. Specifically, FIG. 42 is an isometric view of the housing 506; FIG. 43 is a front elevational view of the housing 506; FIG. 44 is a back elevational view of the housing 506; FIG. 45 is a first, left side elevational view of the housing 506; FIG. 46 is a second, right side elevational view of the housing 506; FIG. 47 is a top plan view of the housing 506; and FIG. 48 is a bottom plan view of the housing 506.

Figure 52:
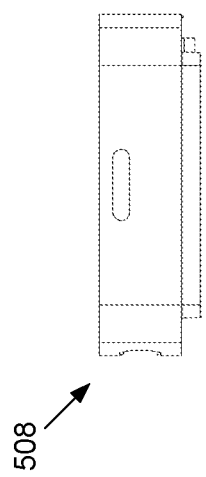
FIG. 52 is a first, left side elevational view of the housing of FIG. 49.
Figure 53:
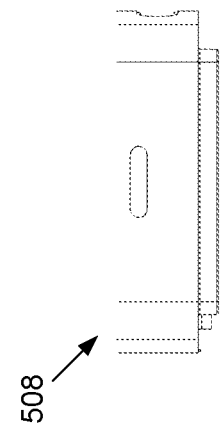
FIG. 53 is a second, right side elevational view of the housing of FIG. 49.
Figure 55:
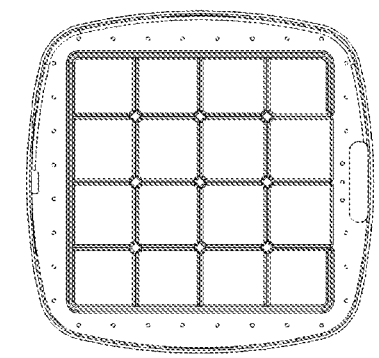
FIG. 55 is a bottom plan view of the housing of FIG. 49.
Figure 50:
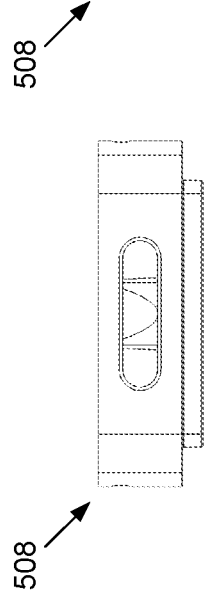
FIG. 50 is a front elevational view of the housing of FIG. 49.
Figure 51:
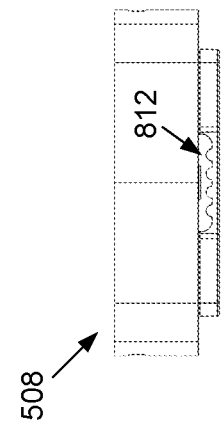
FIG. 51 is a back elevational view of the housing of FIG. 49.
Figure 54:
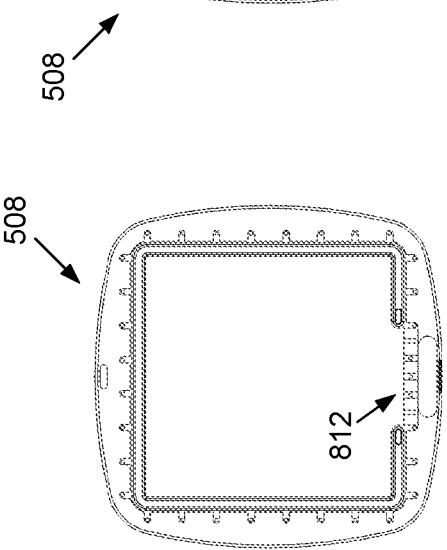
FIG. 54 is a top plan view of the housing of FIG. 49.
Figure 49:
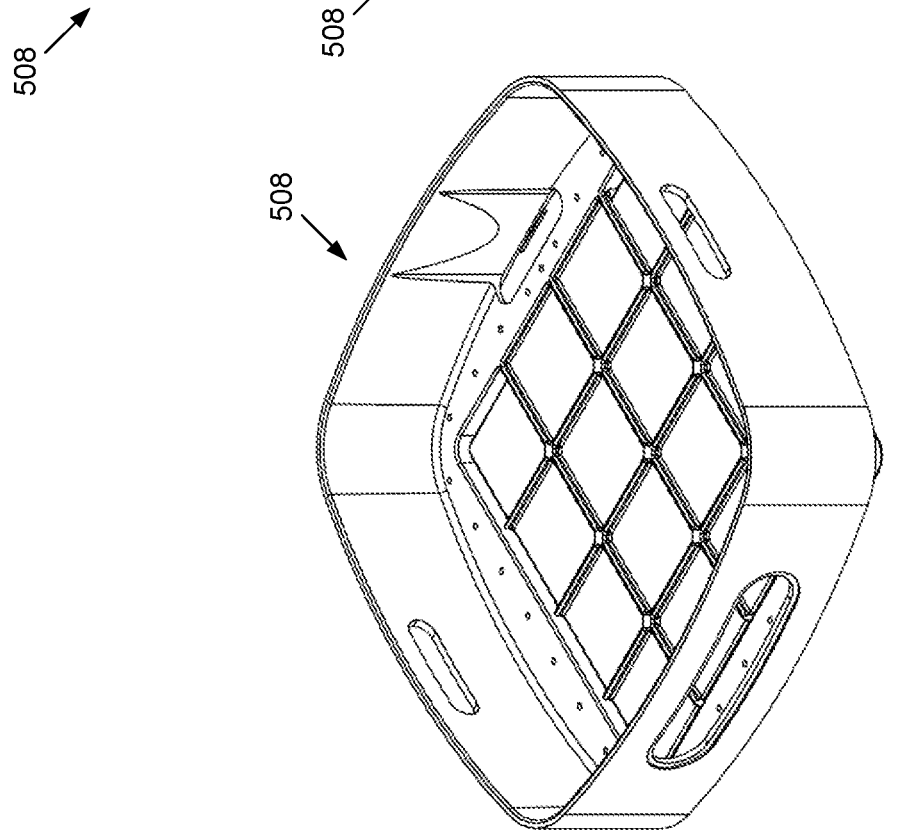
FIG. 49 is an isometric view of another housing of an electronics module that is smaller in height than the housing of FIG. 42.

FIGS. 49-55 illustrate an alternative housing 508 for an electronics module. Specifically, FIG. 49 is an isometric view of housing 508; FIG. 50 is a front elevational view of the housing 508; FIG. 51 is a back elevational view of the housing 508; FIG. 52 is a first, left side elevational view of the housing 508; FIG. 53 is a second, right side elevational view of the housing 508; FIG. 54 is a top plan view of the housing 508; and FIG. 55 is a bottom plan view of the housing 508.

Figures 58, 59, 60:
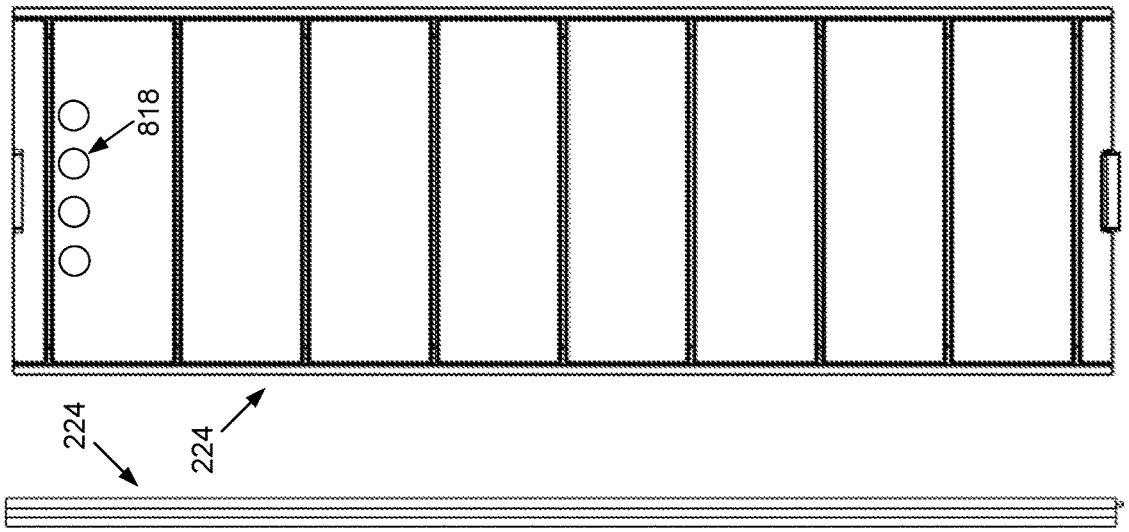
FIG. 58 is a first, left side elevational view of the panel of FIG. 56.
FIG. 59 is an elevational view of an interior side of the panel of FIG. 56.
FIG. 60 is a second, right side elevational view of the panel of FIG. 56.
Figure 57:
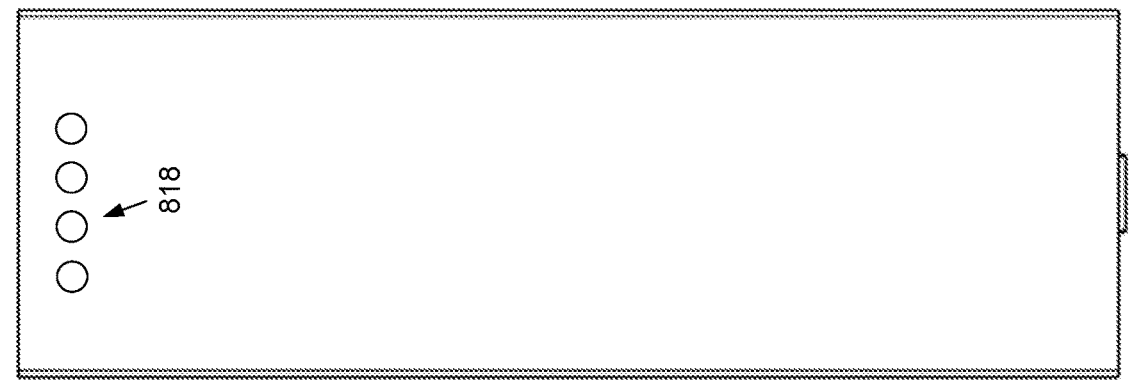
FIG. 57 is an elevational view of an exterior side of the panel of FIG. 56.
Figure 56:
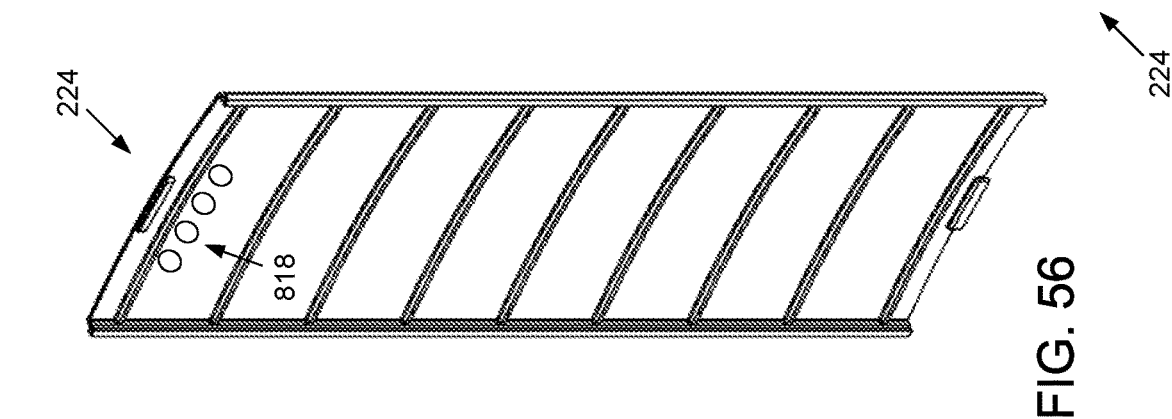
FIG. 56 is an isometric view of a component of each of the apparatus of FIGS. 1 and 16, the component comprising a back cover panel for the tank of FIG. 27.

FIGS. 56-60 illustrate a component of the tank module 206, namely, back cover panel 224. Specifically, FIG. 56 is an isometric view of the back cover panel 224; FIG. 57 is an elevational view of an exterior side of the back cover panel 224; FIG. 58 is a first, left side elevational view of the back cover panel 224; FIG. 59 is an elevational view of an interior side of the back cover panel 224; and FIG. 60 is a second, right side elevational view of the back cover panel 224.

Figures 64, 65, 67:
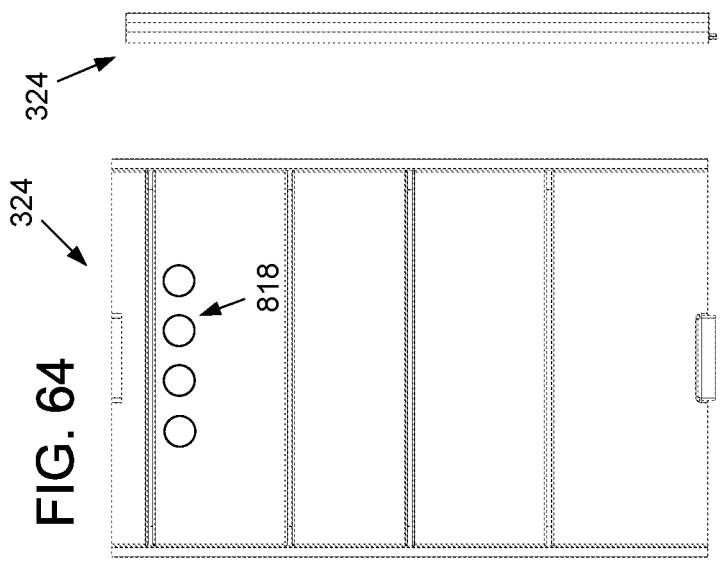
FIG. 64 is an elevational view of an interior side of the panel of FIG. 61.
FIG. 65 is a second, right side elevational view of the panel of FIG. 61.
FIG. 67 is a bottom plan view of the panel of FIG. 61.
Figures 62, 63, 66:
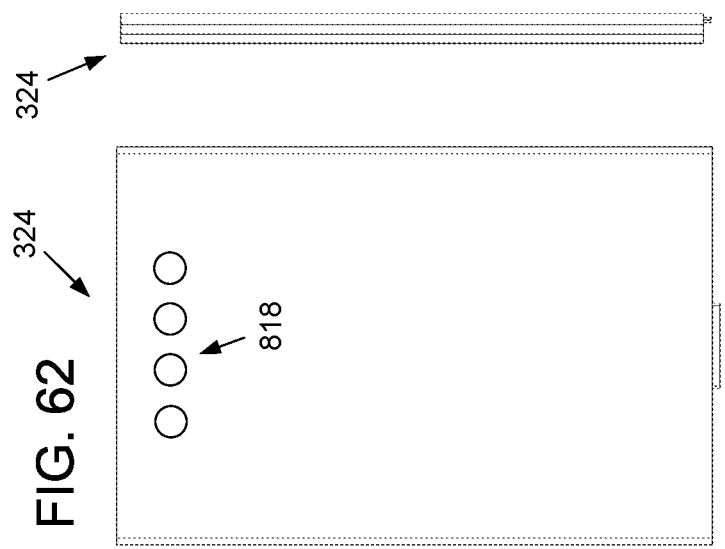
FIG. 62 is an elevational view of an exterior side of the panel of FIG. 61.
FIG. 63 is a first, left side elevational view of the panel of FIG. 61.
FIG. 66 is a top plan view of the panel of FIG. 61.
Figure 61:
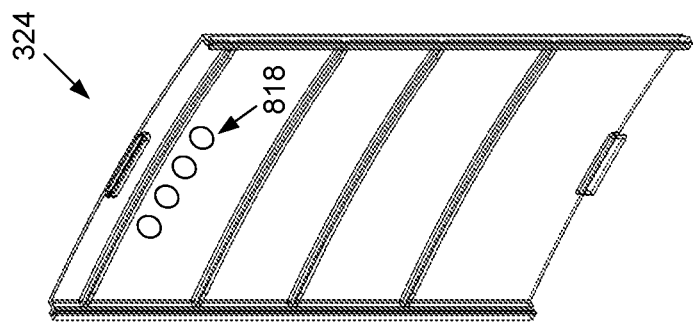
FIG. 61 is an isometric view of a component of each of the apparatus of FIGS. 9 and 16, the component comprising a back cover panel for the tank of FIG. 34.

FIGS. 61-67 illustrate a component of the tank module 306, namely, back cover panel 324. Specifically, FIG. 61 is an isometric view of the back cover panel 324; FIG. 62 is an elevational view of an exterior side of the back cover panel 324; FIG. 63 is a first, left side elevational view of the back cover panel 324; FIG. 64 is an elevational view of an interior side of the back cover panel 324; FIG. 65 is a second, right side elevational view of the back cover panel 324; FIG. 66 is a top plan view of the back cover panel 324; and FIG. 67 is a bottom plan view of the back cover panel 324.

FIGS. 68-72 illustrate a component of all of the apparatus 200,300,400, namely, the lid 210. Specifically, FIG. 68 is an isometric view of the lid 210; FIG. 69 is a front elevational view of the lid 210; FIG. 70 is a side elevational view of the lid 210; FIG. 71 is a top plan view of the lid 210; and FIG. 72 is bottom plan view of the lid 210.

Figure 73:
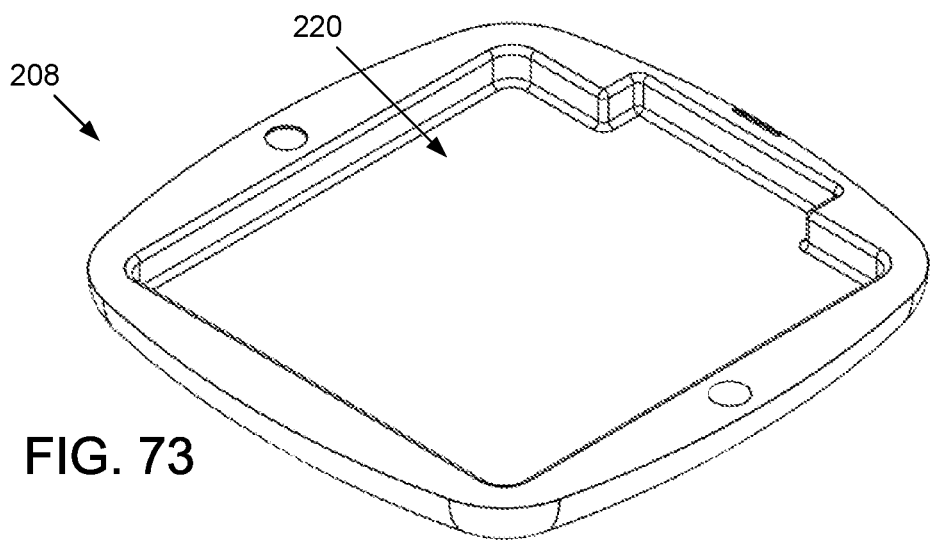
FIG. 73 is an isometric view of a component of each of the apparatus of FIGS. 1, 9 and 16, the component comprising a base for supporting each of the stacks of the apparatus.
Figure 74:
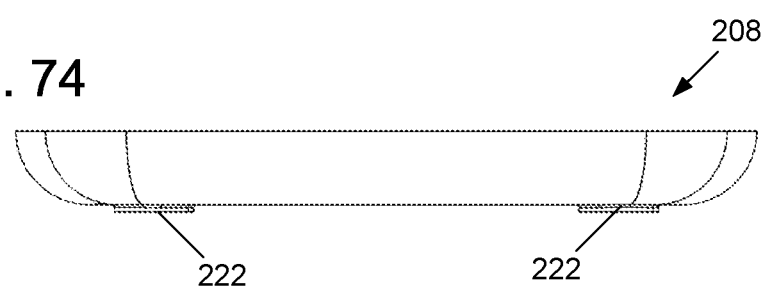
FIG. 74 is an elevational view of the base of FIG. 73.
Figure 75:
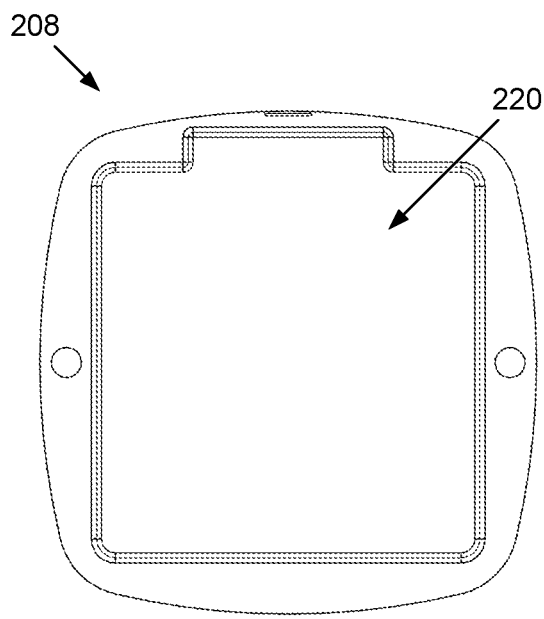
FIG. 75 is a top plan view of the base of FIG. 73.
Figure 76:
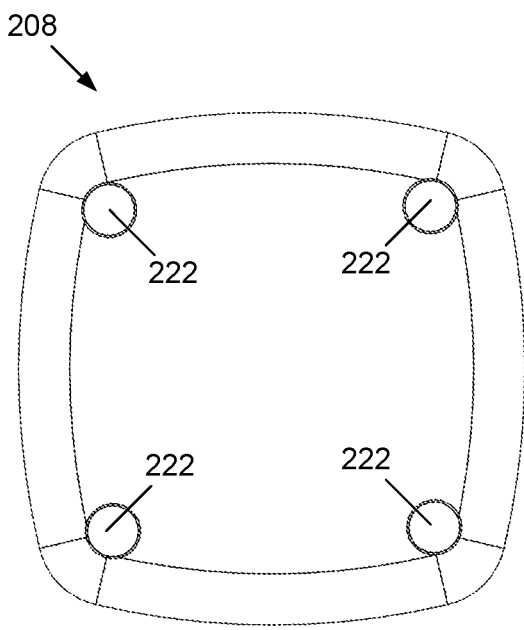
FIG. 76 is a bottom plan view of the base of FIG. 73.

FIGS. 73-76 illustrate a component of all of the apparatus 200,300,400, namely, the base 208. Specifically, FIG. 73 is an isometric view of the base 208; FIG. 74 is an elevational view of the base 208; FIG. 75 is a top plan view of the base 208; and FIG. 76 is a bottom plan view of the base 208.

Various preferred implementations of Modular PCM-TB Apparatus will now be described with reference to FIGS. 77-121.

As a result of the modular, stackability of the apparatus, a number of different combinations of tank modules in an apparatus stack are possible for meeting various implementation needs, all such apparatus having the same small footprint. Indeed, because of the different combinations of tank modules that can be included in an apparatus stack, apparatus can be deployed in a number of different ways to achieve different operational objectives.

For instance, each tank module in an apparatus stack can be used in a separate application for either heating or cooling, and an additional application can be provided by adding another tank module to the stack. Alternatively, plumbing can be installed in the recessed areas that form chases in the back of the tank modules for interconnecting the tank modules, whether in parallel or in series. In this manner, all tanks in an apparatus stack can be used in for a singular application. Or one or more interconnected tank modules can be used for one application, while other tank modules in the stack can be used for one or more other applications.

Moreover, the apparatus also can be used for cooling applications, and if one or more tank modules are used in cooling applications while one or more other tank modules are used in heating applications, then additional synergies can be realized by having a discharging circuit of one or more tank modules used in cooling applications serve as the charging circuit for one or more other tank modules used in heating applications.

An example of an apparatus stack containing two tank modules 775,777 with each being used in a separate application is illustrated in FIGS. 77-78. FIG. 77 is a back elevational view of the preferred Modular PCM-TB Apparatus 770 with this apparatus stack. The back cover panels of the tank modules are omitted for clarity of illustration; however, FIG. 81 does illustrate the back elevational view of the apparatus 770 with back cover panels 792,794 attached.

As shown in FIG. 77, tank module 775 includes thermal battery TB1 with four external connection ports. A first pair of the connection ports represent the inflow and outflow of a PCM charging circuit, and the second pair of the connection ports represent the inflow and outflow of a PCM discharging circuit. Similarly, tank module 777 includes thermal battery TB2 with four external connection ports 712,714,716,718, wherein a first pair of the connection ports represent the inflow (port 712) and outflow (port 714) of a PCM charging circuit, and the second pair of the connection ports represent the inflow (port 716) and outflow (port 718) of a PCM discharging circuit. FIG. 78 is a top profile view of the upper tank module 775 and FIG. 79 is a top profile view of the lower tank module 777. These two figures serve to illustrate the external connection ports extending from the upper and lower tank modules. These figures further illustrate the ports comprise threaded connections for connecting hoses or other plumbing in creating heat exchange circuits.

Exemplary heat exchange circuits of a preferred configuration that includes apparatus 770 are schematically illustrated in FIG. 80. In this preferred configuration 800, the charging circuit of the thermal battery TB1 of the tank module 775 is connected to an external heating system via connection ports 712,714. The external heating system preferably comprises an external heating source such as solar thermal, a boiler, a heat pump, or other heat recovery source. A standard heat pump (compressor type) may be used as the charging source and, if so, may be a variable power and capacity heat pump. The input voltage may be 120V or 240V and have a range in kWs.

The discharging circuit of the thermal battery TB1 of the tank module 775 is connected to a heating application such as, for example, a residential forced hot air system, via connection ports 716,718; and, separately, the charging circuit of the thermal battery TB2 of the tank module 777 is connected to another external heating system via connection ports 722,724 and the discharging circuit of the thermal battery TB2 of the tank module 775 connected to a heating application such as, for example, a residential hot water system for washing clothes, showering, and bathing, via connection ports 726,728. When connected to a residential hot water system, usable water preferably is fed by the domestic water line to the input of the discharging circuit of the thermal battery TB2. As the domestic water passes through the discharge circuit it is heated and comes out as hot water at the output of the discharge circuit of the thermal battery TB2.

In contrast, another preferred configuration 820 that includes apparatus 770 is schematically illustrated in FIG. 82. In this preferred configuration, both the charging circuit of the thermal battery TB1 of the tank module 775 and the charging circuit of the thermal battery TB2 of the tank module 777 are connected to the external heating system externally in parallel; and, separately, the discharging circuit of the thermal battery TB1 of the tank module 775 is connected to a heating application such as, for example, a residential forced hot air system, the discharging circuit of the thermal battery TB2 of the tank module 777 is connected to a heating application such as, for example, a residential hot water system for washing clothes, showering, and bathing. As used herein "externally in parallel" refers to a parallel arrangement of a PCM circuit (whether a charging circuit or discharging circuit) being located external to a Modular PCM-TB Apparatus, as schematically illustrated shown in FIG. 82.

In further contrast, FIG. 83 is yet another schematic diagram of heat exchange circuits of a preferred configuration 830 utilizing the apparatus 770. In this preferred configuration, both the charging circuit of the thermal battery TB1 of the tank module 775 and the charging circuit of the thermal battery TB2 of the tank module 777 are connected to the external heating system externally in series; and, separately, the discharging circuit of the thermal battery TB1 of the tank module 775 is connected to a heating application such as, for example, a residential forced hot air system, the discharging circuit of the thermal battery TB2 of the tank module 777 is connected to a heating application such as, for example, a residential hot water system for washing clothes, showering, and bathing. As used herein "externally in series" refers to the serial arrangement of a PCM circuit (whether a charging circuit or discharging circuit) being located external to a Modular PCM-TB Apparatus, as schematically illustrated shown in FIG. 83.

Additional configurations become possible with plumbing installed in the recessed areas in the back of the tank modules for interconnecting the tank modules.

Figure 92:
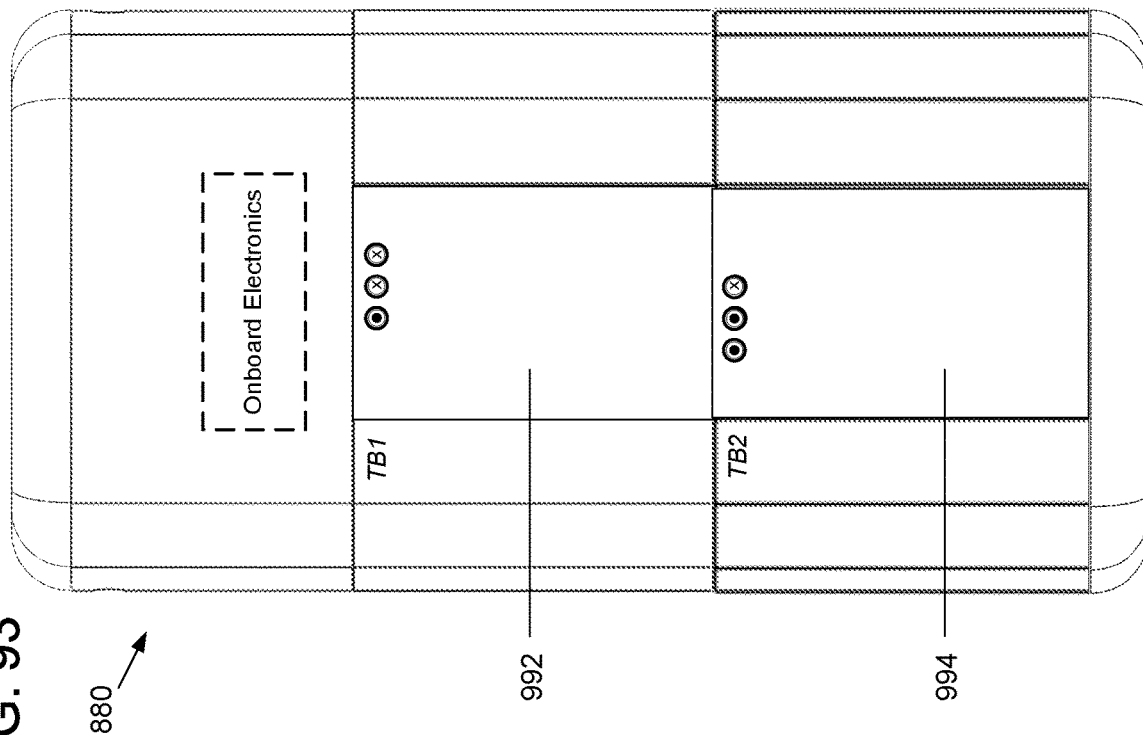
FIG. 92 is a back elevational view of the preferred Modular PCM-TB Apparatus of FIG. 84, wherein the tank cover panels are shown.

A back elevational view of a preferred apparatus 840 which includes plumbing is shown in FIG. 84, wherein the back cover panels are omitted for clarity; a representative view with back cover panels 892,894 attached is shown in FIG. 92. As shown in FIG. 84, tank module 845 includes thermal battery TB1 with four external connection ports. A first pair of the connection ports represent the inflow and outflow of a PCM charging circuit, and the second pair of the connection ports represent the inflow and outflow of a PCM discharging circuit. In contrast, tank module 847 includes thermal battery TB2 with just a pair of external connection ports representing the inflow and outflow of a PCM discharging circuit. FIG. 85 is a top profile view of the upper tank module 845 with the four connection ports extending therefrom, and FIG. 79 is a top profile view of the lower tank module 847 with the two connection ports extending therefrom.

As shown in FIG. 84, plumbing is installed in the recessed areas in the back of the tank modules 845,847 for interconnecting the tank modules. Specifically, the input connection port for the charging circuit of the thermal battery TB1 of tank module 845 is connected by conduit 842 in the form of a pipe or hose to input of the charging circuit of the thermal battery TB2 of tank module 847. Similarly, the output of the charging circuit of the thermal battery TB2 of tank module 847 is connected by conduit 844 in the form of a pipe or hose to the output connection port for the charging circuit of the thermal battery TB1 of tank module 845.

As a result or the plumbing, the PCM charging circuits of the thermal batteries TB1 and TB2 are arranged internally in parallel for charging by the same external heat source. This is schematically illustrated in FIG. 87, wherein heat exchange circuits of a preferred configuration 870 utilizing the apparatus 840 is shown. As used herein "internally in parallel" refers to the parallel arrangement of a PCM circuit (whether a charging circuit or discharging circuit) being located internal to a Modular PCM-TB Apparatus, as schematically illustrated shown in FIG. 87.

Figure 93:
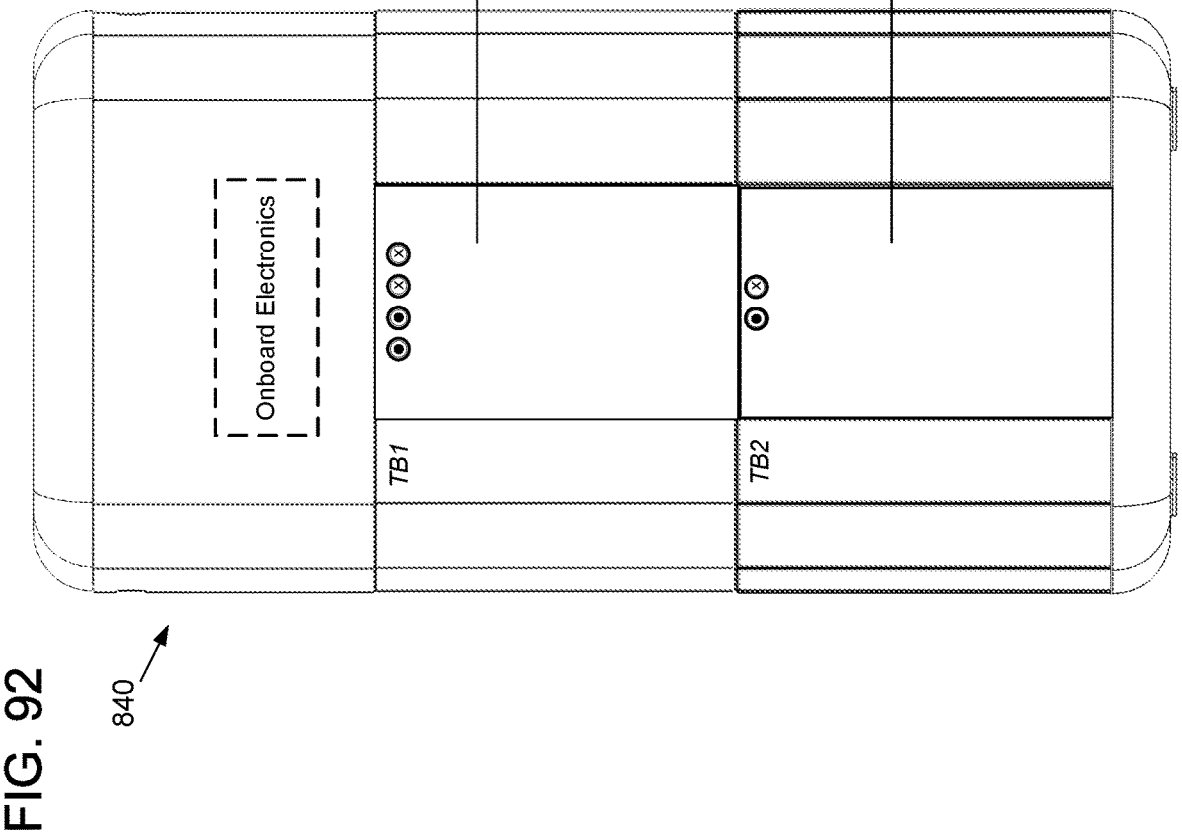
FIG. 93 is a back elevational view of the preferred Modular PCM-TB Apparatus of FIG. 88, wherein the tank cover panels are shown.

A back elevational view of another preferred apparatus 880 which includes plumbing is shown in FIG. 88, wherein the back cover panels are omitted for clarity; a representative view with back cover panels 992,994 attached is shown in FIG. 93. As shown in FIG. 88, tank module 885 includes thermal battery TB1 with three external connection ports. A pair of the connection ports represents the inflow and outflow of a PCM discharging circuit, and the third connection port represent the inflow of a PCM charging circuit of the tank module 885. The tank module 887 includes thermal battery TB2 also with three external connection ports representing the inflow and outflow of a PCM discharging circuit. The third external discharge port of tank module 887 represents the outflow of a PCM charging circuit of the tank module 887. FIG. 89 is a top profile view of the upper tank module 885 with the three external connection ports extending therefrom, and FIG. 90 is a top profile view of the lower tank module 887 with the three connection ports extending therefrom.

As shown in FIG. 88, plumbing is installed in the recessed areas in the back of the tank modules 885,887 for interconnecting the tank modules. Specifically, the output of the charging circuit of the thermal battery TB1 of tank module 885 is connected by conduit 882 in the form of a pipe or hose to input of the charging circuit of the thermal battery TB2 of tank module 887.

As a result or the plumbing, the charging circuits of the thermal batteries TB1 and TB2 are arranged internally in series for charging by the same external heat source. This is schematically illustrated in FIG. 91, wherein heat exchange circuits of a preferred configuration 910 utilizing the apparatus 880 is shown. As used herein "internally in series" refers to the serial arrangement of a PCM circuit (whether a charging circuit or discharging circuit) being located internal to a Modular PCM-TB Apparatus, as schematically illustrated shown in FIG. 91.

Figure 98:
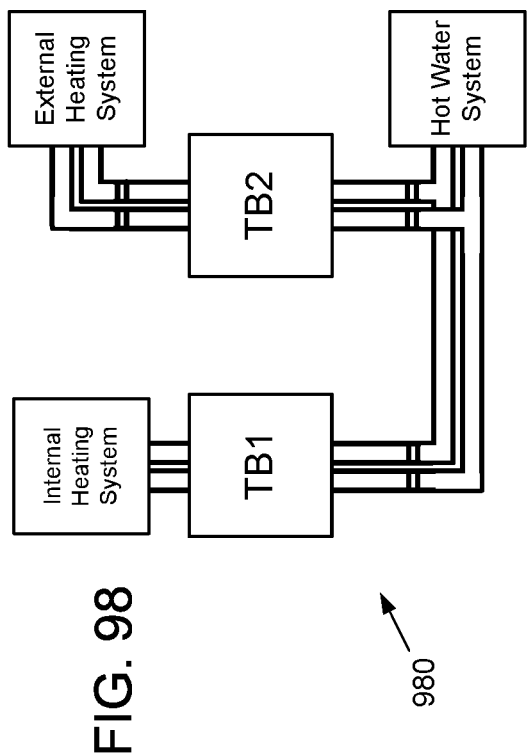
FIG. 98 is a schematic diagram of heat exchange circuits of a preferred configuration utilizing the apparatus of FIG. 94.
Figure 100:
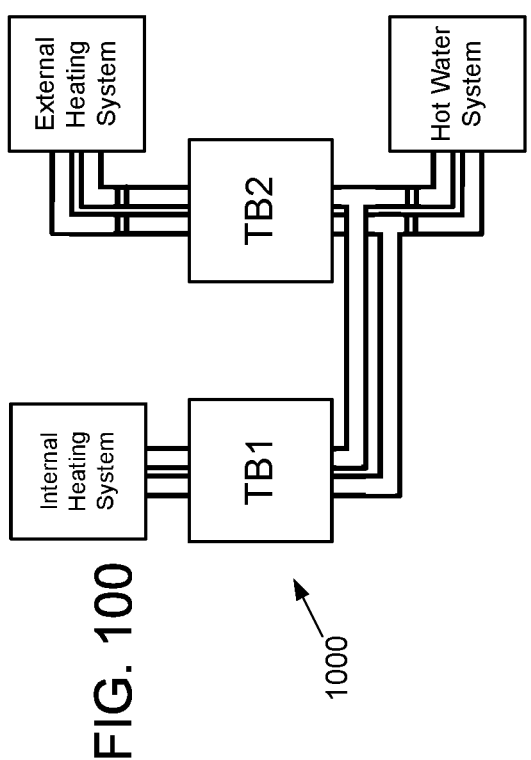
FIG. 100 is a schematic diagram of heat exchange circuits of a preferred configuration utilizing the apparatus of FIG. 102.
Figure 99:
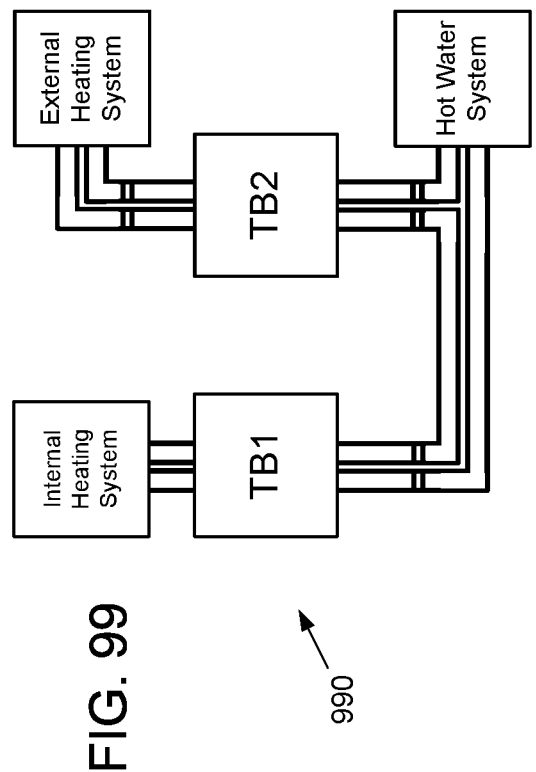
FIG. 99 is a schematic diagram of heat exchange circuits of a preferred configuration utilizing the apparatus of FIG. 94.

While the foregoing has served to illustrate the PCM charging circuits being arranged externally in parallel, externally in series, internally in parallel, and internally in series, it will be appreciated that the PCM discharging circuits can be similarly arranged. FIGS. 98-101 are schematic diagrams representative of this. FIG. 98 shows, inter alia, the PCM discharging circuits of thermal batteries TB1 and TB2 arranged externally in parallel; FIG. 99 shows, inter alia, the PCM discharging circuits of thermal batteries TB1 and TB2 arranged externally in series; FIG. 100 shows, inter alia, the PCM discharging circuits of thermal batteries TB1 and TB2 arranged internally in parallel; and FIG. 100 shows, inter alia, the PCM discharging circuits of thermal batteries TB1 and TB2 arranged internally in series.

It further should be noted that these figures illustrate a preferred apparatus in which the PCM charging circuit of an apparatus is "apparatus-enclosed" which terminology refers to the fact that the circuit is entirely enclosed within the apparatus and there are no external connection ports that lead to the circuit. Preferred Modular PCM-TB Apparatus that have apparatus-enclosed charging circuits are described in greater detail next.

FIG. 94 is a back elevational view of another preferred Modular PCM-TB Apparatus 940, wherein the back cover panels are omitted. FIG. 95 is a top profile view of the upper tank module 945 of the apparatus 940, and FIG. 96 is a top profile view of the lower tank module 947 of the apparatus 940.

Unlike prior apparatus described above, the upper tank module 945 has an apparatus-enclosed PCM charging circuit. In this respect, the electronics module 943 comprise onboard an internal heating system that includes one or more heating sources and one or more pumps. A conduit 944 connects the outflow of the PCM charging circuit to the onboard heating system, and another conduit 942 connects the inflow of the PCM charging circuit to the onboard heating system.

One or more pumps of the onboard heating system recirculates the fluid in the PCM charging circuit and a heating source heats the fluid. The system may comprise, by way of example, one heating element and one pump, or two heating elements and one pump, with an in-line heater at the inlet and another at the outlet of the pump. The heating source preferably is in the form of one or more electric heating elements each located directly within the fluid flow within the electronics module for even heating of the fluid. The circulating heating fluid can be organic fluid like mineral oil or an aqueous fluid like water, glycerin, or the like. The onboard heating system in this case does not include a compressor. Alternatively, the heating system may comprise an onboard heat pump contained within the electronics module and that is ducted or that is vented directly into the ambient space of the apparatus. Furthermore, a backup electric heater as well as a backup circulation pump may be included within the electronics module that work when the heat pump is inoperable or otherwise off. Turning the heat pump off in favor of the electric heater and circulation pump indeed may provide greater efficiency when operation of the heat pump becomes inefficient, such as in colder temperatures that are below, for instance, 25 degrees Fahrenheit.

The pump and heating source preferably are powered by an external electric power source. For instance, a power supply preferably is provided in the electronics module having a power cord for plugging into a conventional electrical outlet. The heating element power preferably ranges from 100 watts to 5000 watts and is operated from a voltage source of 120 volts or 240 volts.

In operation, the PCM preferably is charged a rate that is much less than the rate at which the PCM is discharged when the apparatus is in normal use. It is believed that this enables great efficiencies to be realized with Modular PCM-TB Apparatus.

FIG. 97 is a schematic diagram of heat exchange circuits of a preferred configuration 970 utilizing the apparatus 940. As shown therein, the thermal battery TB1 is independently utilized from the thermal battery TB2, with the thermal battery TB1 being used with a forced hot air system and with the thermal battery TB2 being used with domestic hot water implementations, such as bathing, showering, or washing clothes. The PCM of each tank module 945,947 associated with these thermal batteries also is separately charged using an internal heating source as described above with one and using an external heating system with the other.

Alternative preferred configurations utilizing apparatus 940 are disclosed in FIGS. 98 and 99. In particular, FIG. 98 shows a preferred configuration 980 in which the PCM discharging circuits of thermal batteries TB1 and TB2 are arranged externally in parallel; and FIG. 99 shows a preferred configuration 990 in which the PCM discharging circuits of thermal batteries TB1 and TB2 are arranged externally in series. In each instance, each of the PCM charging circuits are independently charged by separate heating sources, one of which is an internal heating system and the other of which is an external heating system.

Figure 101:
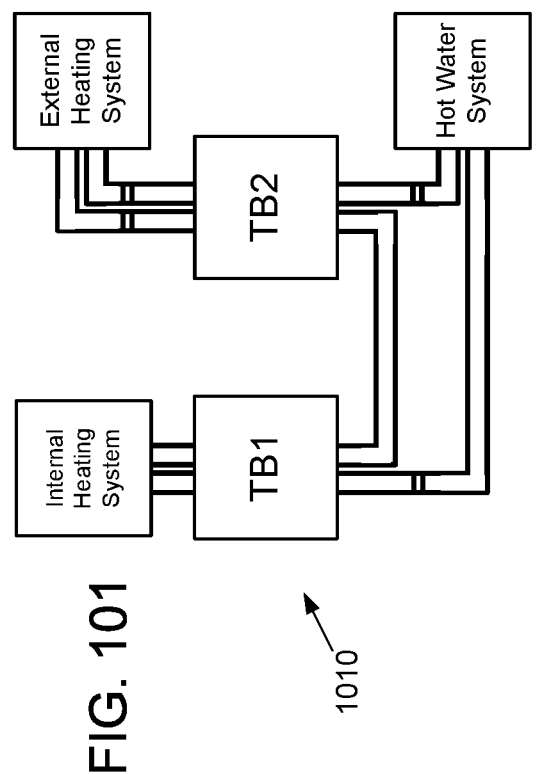
FIG. 101 is a schematic diagram of heat exchange circuits of a preferred configuration utilizing the apparatus of FIG. 105.

Additional preferred configurations utilizing apparatus similar to apparatus 940 are disclosed in FIGS. 100 and 101. FIG. 101 shows a preferred configuration 1000 in which the PCM discharging circuits of thermal batteries TB1 and TB2 are arranged internally in parallel, and FIG. 101 shows a preferred configuration 1010 in which the PCM discharging circuits of thermal batteries TB1 and TB2 are arranged internally in series.

Figure 102:
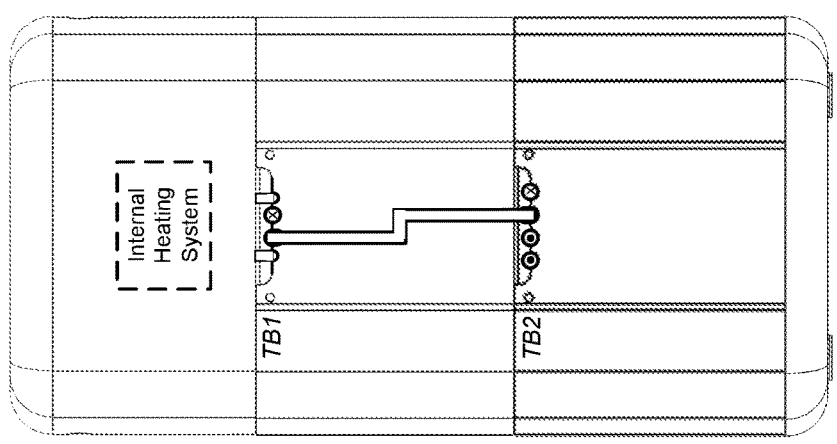
FIG. 102 is a back elevational view of another preferred Modular PCM-TB Apparatus in accordance with one or more aspects and features of the invention, wherein the tank cover panels are omitted.
Figures 103, 104:
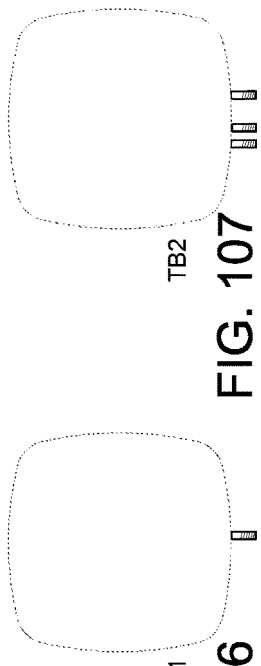
FIG. 103 is a top profile view of the upper tank module of the apparatus of FIG. 102 for the purpose of, inter alia, illustrating that there are no external connection ports of the upper tank module.
FIG. 104 is a top profile view of the lower tank module of the apparatus of FIG. 102 for the purpose of, inter alia, illustrating external connection ports of the lower tank module.

A preferred Modular PCM-TB Apparatus 1020 for use in the preferred configuration 1000 is illustrated in FIG. 102, wherein the tank cover panels are omitted. Apparatus 1020 comprises plumbing effecting the arrangement of PCM discharging circuits internally in parallel. FIG. 103 is a top profile view of the upper tank module of the apparatus 1020, which illustrates that there are no external connection ports of the upper tank module. FIG. 104 is a top profile view of the lower tank module of the apparatus 1020, which illustrates that there are four external connection ports of the lower tank module.

Figure 105:
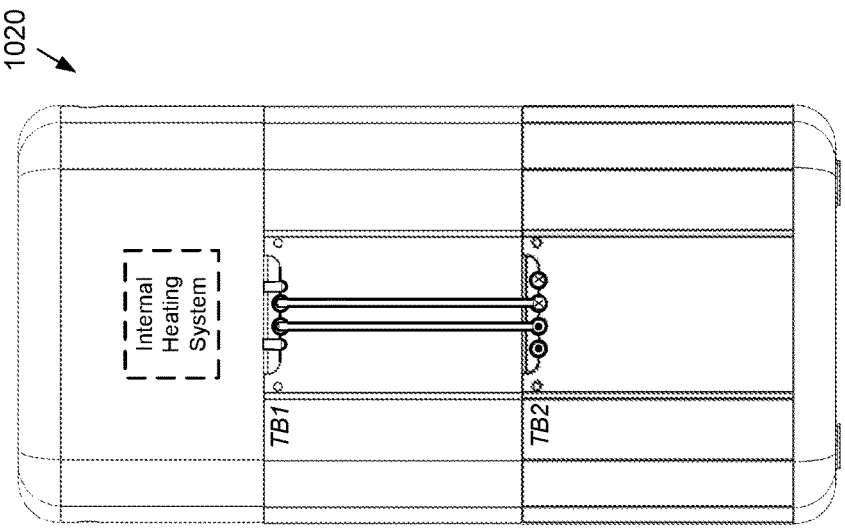
FIG. 105 is a back elevational view of another preferred Modular PCM-TB Apparatus in accordance with one or more aspects and features of the invention, wherein the tank cover panels are omitted.
Figures 106, 107:
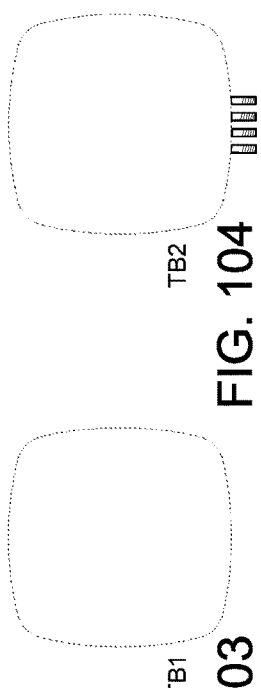
FIG. 106 is a top profile view of the upper tank module of the apparatus of FIG. 105 for the purpose of, inter alia, illustrating external connection ports of the upper tank module.
FIG. 107 is a top profile view of the lower tank module of the apparatus of FIG. 105 for the purpose of, inter alia, illustrating external connection ports of the lower tank module.

A preferred Modular PCM-TB Apparatus 1050 for use in the preferred configuration 1010 is illustrated in FIG. 105, wherein the tank cover panels are omitted. Apparatus 1050 comprises plumbing effecting the arrangement of PCM discharging circuits internally in series. FIG. 106 is a top profile view of the upper tank module of the apparatus 1050, which illustrates that there is one external connection port of the upper tank module. FIG. 107 is a top profile view of the lower tank module of the apparatus 1050, which illustrates that there are three external connection ports of the lower tank module.

A preferred embodiment having both interconnected tank modules and an internal heating system now is described.

FIG. 108 is a back elevational view of a preferred Modular PCM-TB Apparatus 1080, wherein the back cover panels are omitted, and FIG. 109 is a back elevational view of the apparatus 1080, wherein attached back cover panels 1085,1087 are shown. FIG. 110 is a top profile view of the upper tank module 1085 showing two connection ports of the PCM discharging circuit extending therefrom, and FIG. 111 is a top profile view of the lower tank module 1087 showing two connection ports the PCM discharging circuit extending therefrom.

Like prior apparatus 940, the upper tank module 1085 of apparatus 1080 has an apparatus-enclosed PCM charging circuit. Unlike prior apparatus 940, the lower tank module 1087 of apparatus 1080 also has an apparatus-enclosed PCM charging circuit. Moreover, the two apparatus-enclosed PCM charging circuits are arranged internally in parallel with the internal heating system located within the electronics module 1089 of apparatus 1080. In this respect, the electronics module 1089 comprises an onboard, internal heating system that includes one or more heating sources and one or more pumps.

A conduit 1084 connects the outflow of the PCM charging circuit of the upper tank module 1085 to the onboard heating system, and another conduit 1082 connects the inflow of the PCM charging circuit of the upper tank module 1085 to the onboard heating system. Similarly, a conduit 1088 connects the outflow of the PCM charging circuit of the lower tank module 1087 to the onboard heating system, and another conduit 1086 connects the inflow of the PCM charging circuit of the lower tank module 1085 to the onboard heating system.

Within the electronics module 1089, the arrangement of the PCM charging circuits of the tank modules 1085,1087 to the onboard, internal heating system is in parallel, as schematically shown in the heat exchange circuits of a preferred configuration 1120 of FIG. 112, or alternatively, the arrangement of the PCM charging circuits of the tank modules 1085,1087 to the onboard, internal heating system is in series, as schematically shown in the heat exchange circuits of a preferred configuration 1130 of FIG. 113. Of course, heating systems may be provided separately instead, one each being connected to a respective one of the PCM charging circuits.

One or more pumps of the onboard heating system circulates the fluid in each PCM charging circuit and a heating source heats the fluid. The heating source preferably is in the form of one or more electric heating elements each located directly within the fluid flow within the electronics module 1089. The pump and heating source preferably are powered by an external electric power source. For instance, a power supply preferably is provided in the electronics module 1089 having a power cord for plugging into a conventional electrical outlet. The PCM preferably is charged a rate that is much less than the rate at which the PCM is discharged when the apparatus is in normal use. It is believed that this enables high efficiencies to be realized with Modular PCM-TB Apparatus.

As noted above, apparatus in accordance with one or more aspects and features of the invention can be used not only for heating applications, but also for cooling applications. Moreover, if one or more tank modules are used in cooling applications while one or more other tank modules are used in heating applications, then additional synergies can be realized by having a discharging circuit of one or more tank modules used in cooling applications serve as the charging circuit for one or more other tank modules used in heating applications.

Figure 114B:
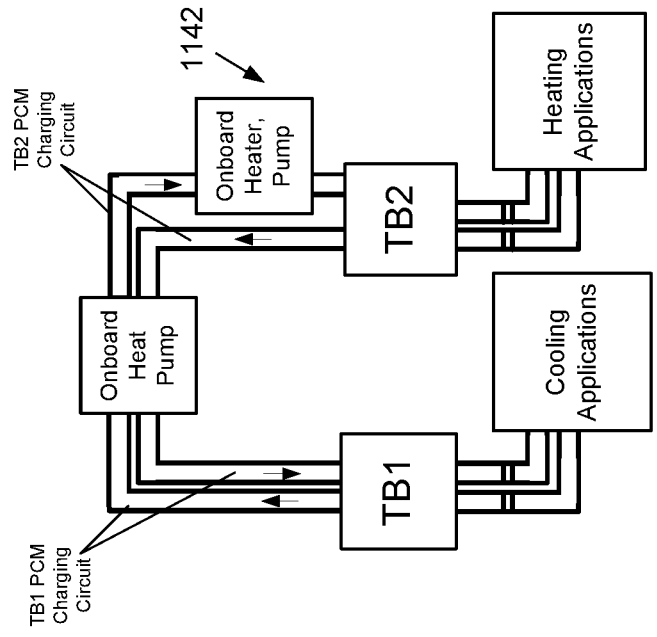
FIG. 114b is another schematic diagram of heat exchange circuits of a preferred configuration utilizing a preferred Modular PCM-TB Apparatus in accordance with one or more aspects and features of the invention.
Figure 114A:
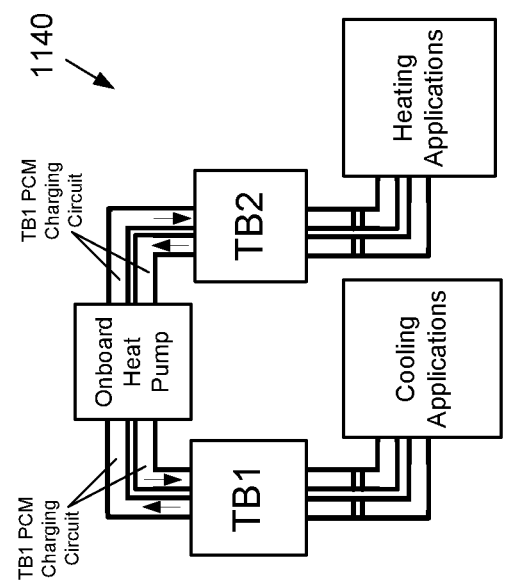
FIG. 114a is a schematic diagram of heat exchange circuits of another preferred configuration utilizing a preferred Modular PCM-TB Apparatus in accordance with one or more aspects and features of the invention.

In this regard, FIG. 114*a* is a schematic diagram of heat exchange circuits of a preferred configuration 1140 in which a PCM charging circuit of a first of the thermal batteries TB1 and TB2 is connected by an onboard heat pump with a PCM charging circuit of the second of the thermal batteries TB1 and TB2. Preferably, the conduits extend through the electronics module to the onboard heat pump. Optionally, an electric heater with circulating pump preferably is provided within the electronics module in connection with the PCM charging circuit for the thermal battery that is used in the heating applications, as shown in the schematic diagram of heat exchange circuits of the preferred configuration 1142 in FIG. 114*b*. The electronics of the electronics module preferably monitor temperatures and status of the PCM in each thermal battery for purposes of controlling the fluid circulation and heat exchanged between the PCM charging circuits via the onboard heat pump. The plumbing seen in FIG. 108 of apparatus 1080 is representative of the appearance of an apparatus in this configuration 1140, with the pump system being located in the electronics module 1089 with the other onboard electronics.

FIG. 115 is a back elevational view of yet another preferred Modular PCM-TB Apparatus 1150, wherein the back cover panels are omitted. Apparatus 1150 includes plumbing installed on the back of the tank modules that interconnects the PCM circuits of the two stacked thermal batteries TB1 and TB2.

The PCM circuits of apparatus 1150 are illustrated in FIGS. 116-119. FIG. 116 illustrates PCM charging circuit 1160 of thermal battery TB1; FIG. 117 illustrates PCM discharging circuit 1170 of thermal battery TB1; FIG. 118 illustrates PCM charging circuit 1180 of thermal battery TB2; and FIG. 119 illustrates PCM discharging circuit 1190 of thermal battery TB2. Each of these circuits comprises six heat exchangers immersed in a bio-based phase change material PCM1 and PCM2.

Apparatus 1150 differs from prior apparatus described in connection with the drawings in that valves V1,V2,V3,V4, V5,V6,V7 are provided, and one or more external connection ports P1,P2,P3,P4,P5,P6,P7,P8 may be capped, for reconfiguring fluid flow through the plumbing. The valves and capping of the external connection ports enable great flexibility in utilizing the apparatus 1150 in a number of different heat exchange circuits. Valve open and closed states, and port connected and capped states, are set forth in tables 1 and 2 of FIGS. 120 and 121 for effecting the various configurations identified therein.

It will be appreciated that while plumbing could be configured to support PCM charging in series within the scope of the invention, it is believed that PCM charging in parallel is preferred when only heating applications are intended or only cooling applications are intended. Consequently, the plumbing illustrated in FIG. 115 and tables of FIGS. 120 and 121 do not enable charging of the PCM of the thermal batteries TB1 and TB2 in series.

It is additionally noted that in some preferred apparatus, plumbing is utilized with one or more thermal batteries in a stack wherein the PCM of a thermal battery is able to be charged not only with an internal heating system, but also with an external heating system upon proper adjustment of the plumbing. In this respect, the apparatus is configured to switch the PCM charging circuit between a closed loop, in which the fluid that flows through the PCM charging circuit does not flow external to the apparatus, and an open loop, in which the fluid that flows through the PCM charging circuit flows to an external heating system located on an exterior of the apparatus.

From the foregoing, it will be appreciated that preferred apparatus in accordance with one or more aspects and features of the invention embody a scalable modular design in which a thermal battery assembly can be repurposed by adding additional tank modules for accommodating changed situations, such as transitioning from hot water requirements from a one bedroom apartment to those for a three bedroom apartment. Tank modules also can be taken away for a downsizing situation. Modules can also be replaced as needed without replacing other modules or components. Moreover, varying the capacity of a thermal battery assembly does not alter its footprint but, instead, only its height, allowing for options for space-heating add-ons in addition to hot water, thermal energy storage. Installations are also made easier, as the modules and components can be carried individually to the site of installation. This is especially true in multi-level or high rise buildings without elevators.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

For instance, as disclosed herein, an onboard pump system may comprise one or more pumps that may be located at multiple locations along a fluid pathway. Similarly, a heating system may comprise one or more heaters that may be located at one or more various locations along a fluid pathway.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A modular, stackable thermal battery assembly, comprising:
    (a) a plurality of modules configured to be vertically stacked on top of each other, the plurality of modules comprising at least an electronics module and a tank module; and
    (b) a base defining a bottom of the stack configured to receive thereon the lowermost module of the stack for supporting the stack on a floor;
    (c) wherein the tank module comprises,
        (i) a phase change material (PCM),
        (ii) a heat exchanger assembly comprising a plurality of heat exchangers immersed within the phase change material, a first set of the heat exchangers defining a PCM charging circuit for charging the phase change material, and a second set of the heat exchangers defining a PCM discharging circuit for discharging the phase change material, and
        (iii) exterior connection ports comprising a first exterior connection port configured for fluid communication with an inflow of the PCM discharging circuit and a second exterior connection port configured for fluid communication with an outflow of the PCM discharging circuit.

2. The modular, stackable PCM-based thermal battery assembly of claim 1, wherein the tank module further comprises exterior connection ports comprising a first exterior connection port configured for fluid communication with an inflow of the PCM charging circuit, and a second exterior connection port configured for fluid communication with an outflow of the PCM charging circuit.

3. The modular, stackable PCM-based thermal battery assembly of claim 1, wherein the electronics module comprises an onboard charging system and wherein the PCM charging circuit is connected to the charging system for charging of the PCM.

4. The modular, stackable PCM-based thermal battery assembly of claim 3, wherein the tank module defines a chase and the assembly comprises plumbing that connects the PCM charging circuit in fluid communication with the onboard charging system in a closed fluid loop, the PCM charging circuit being apparatus-enclosed.

5. The modular, stackable PCM-based thermal battery assembly of claim 3, wherein the onboard charging system comprises a heat pump.

6. The modular, stackable PCM-based thermal battery assembly of claim 3, wherein the onboard charging system comprises an in-line electric heater located within fluid flow and a recirculation pump.

7. The modular, stackable PCM-based thermal battery assembly of claim 3, wherein the onboard charging system comprises a heat pump, an in-line electric heater located within fluid flow, and a recirculation pump.

8. The modular, stackable PCM-based thermal battery assembly of claim 1, wherein when stacked the plurality of modules collectively define a continuous exterior surface with seams defined therebetween.

9. The modular, stackable PCM-based thermal battery assembly of claim 1, wherein the exterior connection ports are located on and extend from a back of the tank module.

10. The modular, stackable PCM-based thermal battery assembly of claim 1, wherein the PCM charging circuit comprises a fluid flow arrangement of the heat exchangers that is in parallel.

11. The modular, stackable PCM-based thermal battery assembly of claim 1, wherein the PCM discharging circuit comprises a fluid flow arrangement that is in series.

12. The modular, stackable PCM-based thermal battery assembly of claim 1, wherein a lid is configured to be received on the uppermost module of the stack in covering relation to a top opening of the uppermost module.

13. The modular, stackable PCM-based thermal battery assembly of claim 12, wherein the electronics module defines a top of the stack and is configured to receive the lid thereon, the lid enclosing and protecting electronics that are contained within the electronics module.

14. The modular, stackable PCM-based thermal battery assembly of claim 1, wherein sensors are contained within the tank module for determining local temperatures of the phase change material therein, from which a measure of charge of the PCM may be determined, and wherein the tank module comprises a visual display that indicates the measure of charge.

15. The modular, stackable PCM-based thermal battery assembly of claim 14, wherein the measure of charge is determined by electronic components contained in the electronics module.

16. The modular, stackable PCM-based thermal battery assembly of claim 1, wherein sensors are contained within the tank module for determining local temperatures of the phase change material therein, and wherein the electronics module comprises a visual display that indicates a temperature associated with the tank module.

17. The modular, stackable PCM-based thermal battery assembly of claim 1, wherein the stack further comprises an additional tank module.

18. The modular, stackable PCM-based thermal battery assembly of claim 17, wherein the additional tank module is the lowermost module of the stack and that is received by and supported on top of the base.

19. The modular, stackable PCM-based thermal battery assembly of claim 17, wherein the additional tank module comprises,
(i) a phase change material (PCM), and
(ii) a heat exchanger assembly comprising a plurality of heat exchangers immersed within the phase change material, a first set of the heat exchangers defining a PCM charging circuit for charging the phase change material, and a second set of the heat exchangers defining a PCM discharging circuit for discharging the phase change material.

20. The modular, stackable PCM-based thermal battery assembly of claim 19, wherein the assembly comprises plumbing that interconnects in fluid communication one or more PCM circuits of the tank module with one or more PCM circuits of the additional tank module.

21. The modular, stackable PCM-based thermal battery assembly of claim 20, wherein the assembly comprises valves for controlling the interconnection.

22. The modular, stackable PCM-based thermal battery assembly of claim 21, wherein the assembly further comprises caps for controlling fluid flow from and to the PCM circuits of the two tank modules.

23. The modular, stackable PCM-based thermal battery assembly of claim 19, wherein the assembly comprises plumbing that interconnects in fluid communication one or more PCM circuits of each of the two tank modules to components of the electronics module.

24. The modular, stackable PCM-based thermal battery assembly of claim 23, wherein the assembly comprises valves for controlling the interconnection.

25. The modular, stackable PCM-based thermal battery assembly of claim 24, wherein the assembly further comprises caps for controlling fluid flow from and to the PCM circuits of the two tank modules.

26. The modular, stackable PCM-based thermal battery assembly of claim 19, wherein the additional tank module further comprises exterior connection ports comprising a first exterior connection port configured for fluid communication with an inflow of the PCM discharging circuit of the additional tank module, and a second exterior connection port configured for fluid communication with an outflow of the PCM discharging circuit of the additional tank module.

27. The modular, stackable PCM-based thermal battery assembly of claim 19, wherein the additional tank module further comprises exterior connection ports comprising a first exterior connection port configured for fluid communication with an inflow of the PCM charging circuit of the additional tank module, and a second exterior connection port configured for fluid communication with an outflow of the PCM charging circuit of the additional tank module.

28. The modular, stackable PCM-based thermal battery assembly of claim 19, wherein the electronics module comprises an onboard charging system and wherein the PCM charging circuit of the additional tank module is connected to the onboard charging system for charging of the PCM of the additional tank module.

29. The modular, stackable PCM-based thermal battery assembly of claim 28, wherein the additional tank module defines a chase and the assembly comprises plumbing that connects the PCM charging circuit of the additional tank module in fluid communication with the onboard charging system in a closed fluid loop, the PCM charging circuit of the additional tank module being apparatus-enclosed.

30. The modular, stackable PCM-based thermal battery assembly of claim 28, wherein the onboard charging system comprises a heat pump.

31. The modular, stackable PCM-based thermal battery assembly of claim 28, wherein the onboard charging system comprises an in-line electric heater located within fluid flow and a recirculation pump.

32. The modular, stackable PCM-based thermal battery assembly of claim 28, wherein the onboard charging system comprises a heat pump, an in-line electric heater located within fluid flow, and a recirculation pump.

33. The modular, stackable PCM-based thermal battery assembly of claim 19, wherein the PCM charging circuit of the tank module and the PCM charging circuit of the additional tank module both are connected to the same charging system.

34. The modular, stackable PCM-based thermal battery assembly of claim 33, wherein the PCM charging circuits are connected to the same charging system internally in parallel.

35. The modular, stackable PCM-based thermal battery assembly of claim 33, wherein the PCM charging circuits are connected to the same charging system externally in parallel.

36. The modular, stackable PCM-based thermal battery assembly of claim 33, wherein the PCM charging circuits are connected to the same charging system internally in series.

37. The modular, stackable PCM-based thermal battery assembly of claim 33, wherein the PCM charging circuits are connected to the same charging system externally in parallel.

38. The modular, stackable PCM-based thermal battery assembly of claim 19, wherein the PCM discharging circuit of the tank module and the PCM discharging circuit of the additional tank module both are connected to the same discharging application.

39. The modular, stackable PCM-based thermal battery assembly of claim 38, wherein the PCM discharging circuits are connected to the same discharging application internally in parallel.

40. The modular, stackable PCM-based thermal battery assembly of claim 38, wherein the PCM discharging circuits are connected to the same discharging application externally in parallel.

41. The modular, stackable PCM-based thermal battery assembly of claim 38, wherein the PCM discharging circuits are connected to the same discharging application internally in series.

42. The modular, stackable PCM-based thermal battery assembly of claim 38, wherein the PCM discharging circuits are connected to the same discharging application externally in parallel.

43. The modular, stackable PCM-based thermal battery assembly of claim 19, wherein the PCM discharging circuit of the tank module and the PCM discharging circuit of the additional tank module both are connected to different discharging applications.

44. The modular, stackable PCM-based thermal battery assembly of claim 43, wherein the PCM discharging circuit of the tank module is connected to a heating application and the PCM discharging circuit of the additional tank module is connected to a different heating application.

45. The modular, stackable PCM-based thermal battery assembly of claim 43, wherein the PCM discharging circuit of the tank module is connected to a heating application and the PCM discharging circuit of the additional tank module is connected to a cooling application.

46. The modular, stackable PCM-based thermal battery assembly of claim 45, wherein the PMC charging circuit of the tank module is apparatus-enclosed, and the PCM charging circuit of the additional tank module is apparatus-enclosed.

47. The modular, stackable PCM-based thermal battery assembly of claim 46, wherein the two PMC charging circuits are connected by an onboard heat pump.

48. The modular, stackable PCM-based thermal battery assembly of claim 47, wherein one of the two PMC charging circuits comprises an onboard electric heater and circulation pump that are located within the electronics module.

* * * * *